US009565406B2

(12) United States Patent
Sugiyama

(10) Patent No.: US 9,565,406 B2
(45) Date of Patent: *Feb. 7, 2017

(54) IMAGE PROCESSING DEVICE, IMAGE PROCESSING METHOD, AND IMAGE PICKUP DEVICE

(71) Applicant: Sony Corporation, Tokyo (JP)

(72) Inventor: Akira Sugiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,562

(22) Filed: Dec. 19, 2014

(65) Prior Publication Data

US 2015/0103215 A1    Apr. 16, 2015

Related U.S. Application Data

(62) Division of application No. 12/965,194, filed on Dec. 10, 2010, now Pat. No. 8,948,503.

(30) Foreign Application Priority Data

Dec. 18, 2009 (JP) ................................ 2009-288074

(51) Int. Cl.
*G06K 9/00* (2006.01)
*H04N 9/077* (2006.01)
(Continued)

(52) U.S. Cl.
CPC .......... *H04N 9/077* (2013.01); *H04N 7/26563* (2013.01); *H04N 9/07* (2013.01); *H04N 19/647* (2014.11)

(58) Field of Classification Search
CPC ........................... H04N 9/077; H04N 7/26563
See application file for complete search history.

(56) References Cited

U.S. PATENT DOCUMENTS 6,678,000 B1 *  1/2004  Sakata ................ H04N 3/1587
                                                348/218.1
7,002,627 B1    2/2006  Raffy et al.
(Continued)

FOREIGN PATENT DOCUMENTS

CN       1497940        5/2004
CN      101076118      11/2007
(Continued)

OTHER PUBLICATIONS

S. Omori and K. Ueda, High-resolution image using several sampling-phase shifted images—density doubling of single chip color CCD with pixel-shift technique, IEEE, 2000, pp. 178-179.*
(Continued)

*Primary Examiner* — Andrae S Allison
(74) *Attorney, Agent, or Firm* — Frommer Lawrence & Haug LLP; William S. Frommer

(57) ABSTRACT

Disclosed herein is an image processing device including a subband dividing section configured to perform subband division of image data of a color whose pixel positions are alternately shifted from each other, the image data being included in image data output from an image pickup element of a pixel arrangement in which the pixel positions of at least one color of three primary colors are alternately shifted from each other in one of a horizontal direction and a vertical direction, with pixels of two upper and lower lines adjacent to each other or pixels of two left and right columns adjacent to each other as a unit.

3 Claims, 26 Drawing Sheets

(51) Int. Cl.
*H04N 9/07* (2006.01)
*H04N 19/64* (2014.01)
*H04N 19/63* (2014.01)

(56) References Cited

U.S. PATENT DOCUMENTS

| | | | |
|---|---|---|---|
| 7,236,650 B1 | 6/2007 | Omori et al. | |
| 7,260,277 B2 * | 8/2007 | Messina | G06T 3/4076 382/299 |
| 8,436,909 B2 | 5/2013 | Farina et al. | |
| 8,531,543 B2 * | 9/2013 | Sugiyama | H04N 5/23203 348/222.1 |
| 8,611,652 B2 * | 12/2013 | Jannard | 345/530 |
| 8,687,086 B1 * | 4/2014 | Campbell | H04N 19/423 348/222.1 |
| 8,948,503 B2 * | 2/2015 | Sugiyama | H04N 9/07 348/222.1 |
| 2003/0223001 A1 * | 12/2003 | Maeda | H04N 5/23245 348/273 |
| 2006/0093234 A1 | 5/2006 | Silverstein | |
| 2006/0165167 A1 * | 7/2006 | Kimoto | H04N 19/63 375/240.11 |
| 2008/0043125 A1 * | 2/2008 | Kozlowski | H01L 27/14621 348/272 |
| 2008/0240203 A1 * | 10/2008 | Baqai | G01V 1/28 375/130 |
| 2010/0097491 A1 * | 4/2010 | Farina | H04N 9/045 348/223.1 |
| 2011/0150330 A1 * | 6/2011 | Jannard | H04N 19/30 382/166 |

FOREIGN PATENT DOCUMENTS

| | | |
|---|---|---|
| CN | 101350930 | 1/2009 |
| CN | 101442673 | 5/2009 |
| CN | 101516031 | 8/2009 |
| JP | 2000-316174 | 11/2000 |
| JP | 2002 247376 | 8/2002 |
| JP | 2003-101791 | 4/2003 |
| JP | 2003 125209 | 4/2003 |
| JP | 2004-128583 | 4/2004 |
| JP | 2007-336387 | 12/2007 |
| JP | 2009-288074 | 12/2009 |
| JP | 5640370 | 11/2014 |

OTHER PUBLICATIONS

P. Vandewalle, S. E. Sasstrunk, and M. Vetterli, "Double resolution from a set of aliased images," in Proceedings of SPIE/IS&T Electronic Imaging 2004: Sensors and Camera Systems for Scientific, Industrial, and Digital Photography Applications V, vol. 5301 of Proceedings of SPIE, pp. 374-382, San Jose, Calif, USA, Jan. 2004.*

S. Y. Lee, and A. Ortega, "A Novel Approach for Image Compression in Digital Cameras with Bayer Color Filter Array," in Proc. of IEEE Intl. Conference on Image Processing, vol. 3, pp. 482-485, Oct. 2001.

Office Action issued in corresponding Japanese Application No. 2014-143202 dated Aug. 18, 2015.

* cited by examiner

DIVISION LEVEL= 3
(H: HIGH FREQUENCY, L: LOW FREQUENCY)

DIVISION LEVEL= 1

DIVISION LEVEL= 3

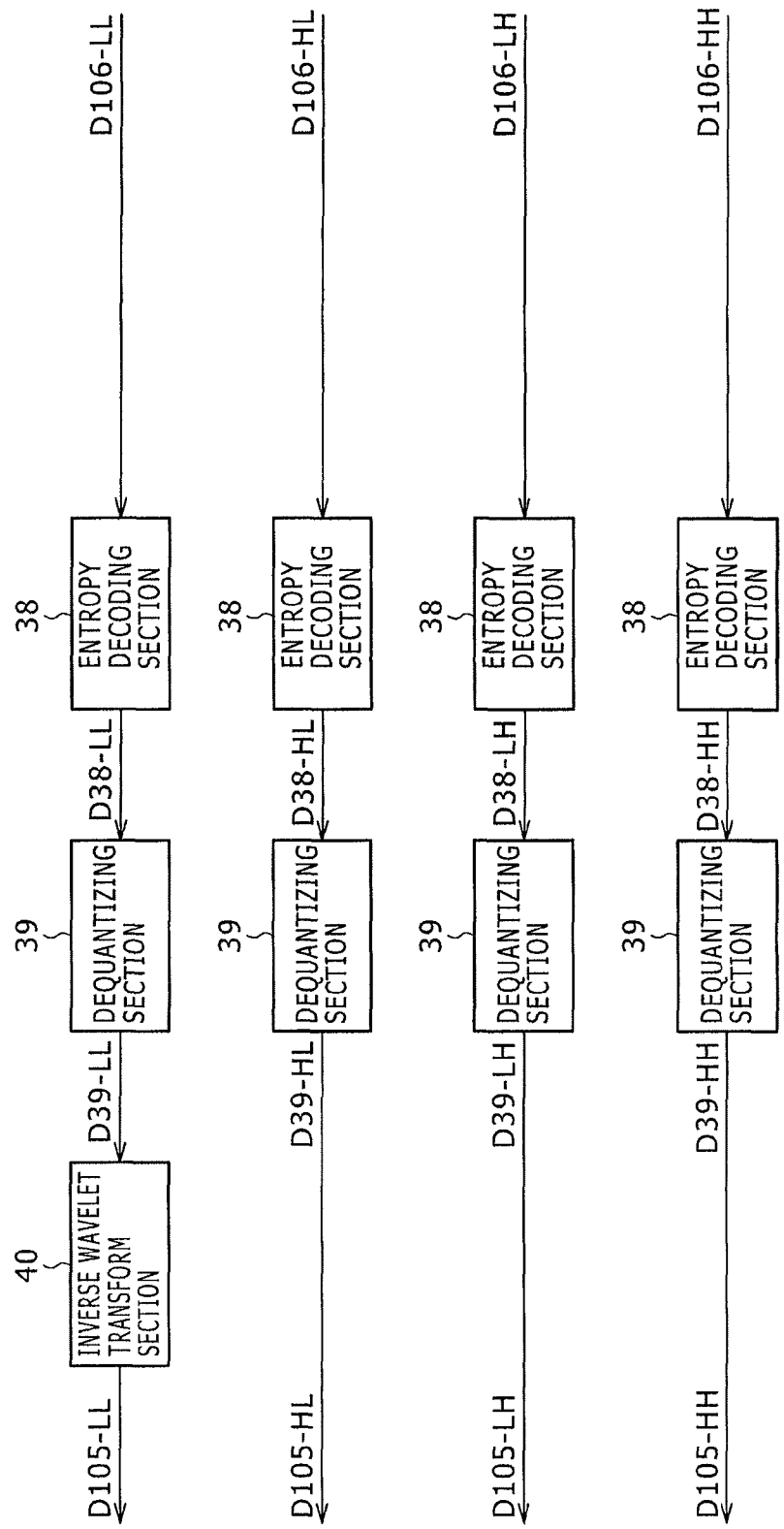

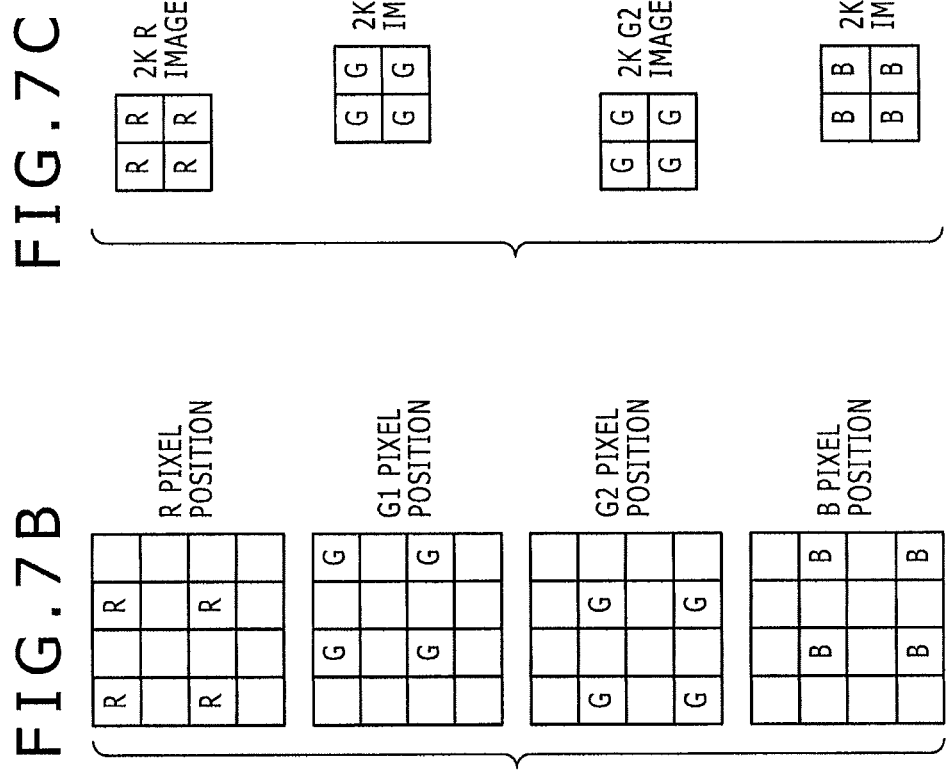
FIG. 7A  4K BAYER RAW IMAGE
FIG. 7B  R PIXEL POSITION, G1 PIXEL POSITION, G2 PIXEL POSITION, B PIXEL POSITION
FIG. 7C  2K R IMAGE, 2K G1 IMAGE, 2K G2 IMAGE, 2K B IMAGE

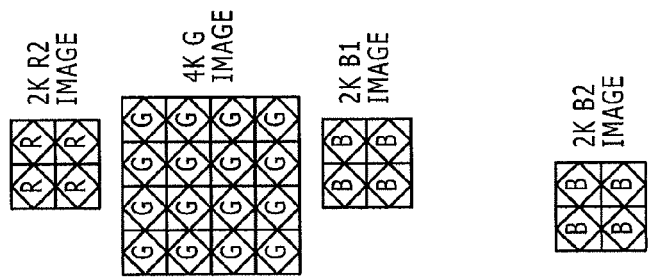
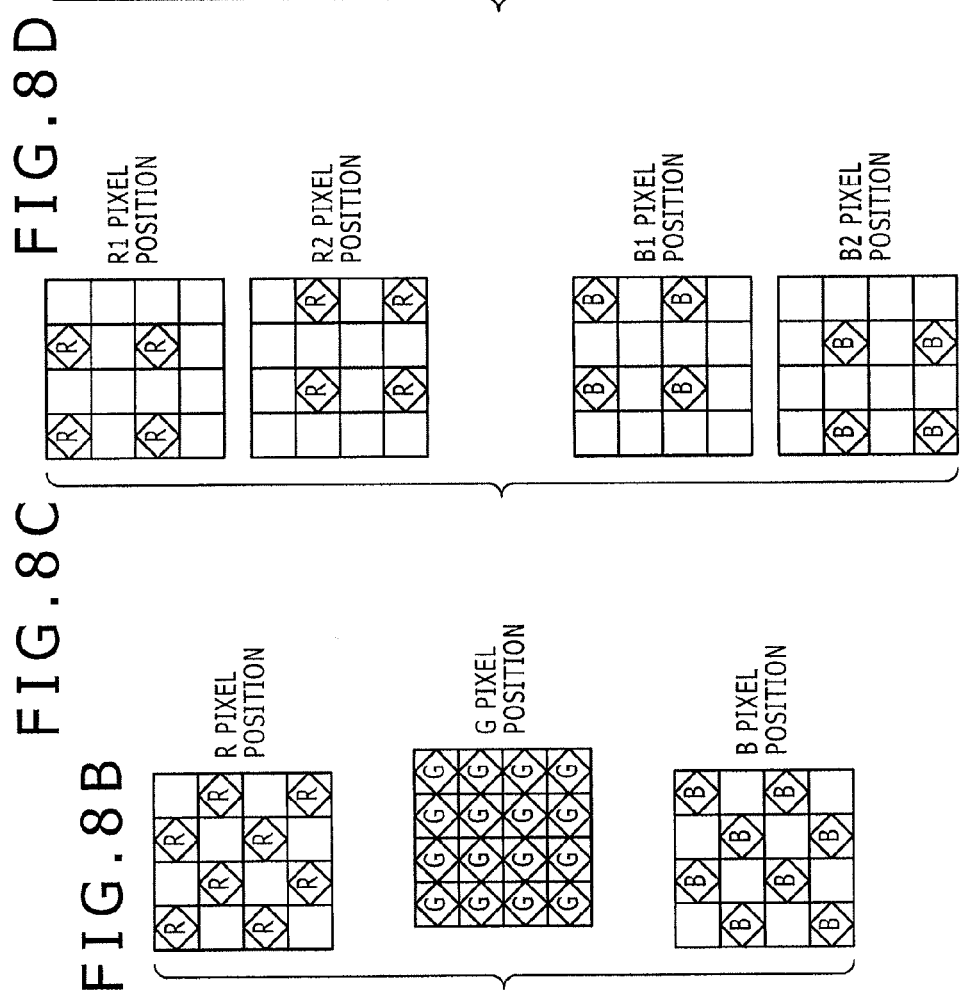
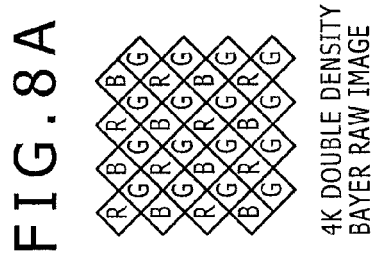

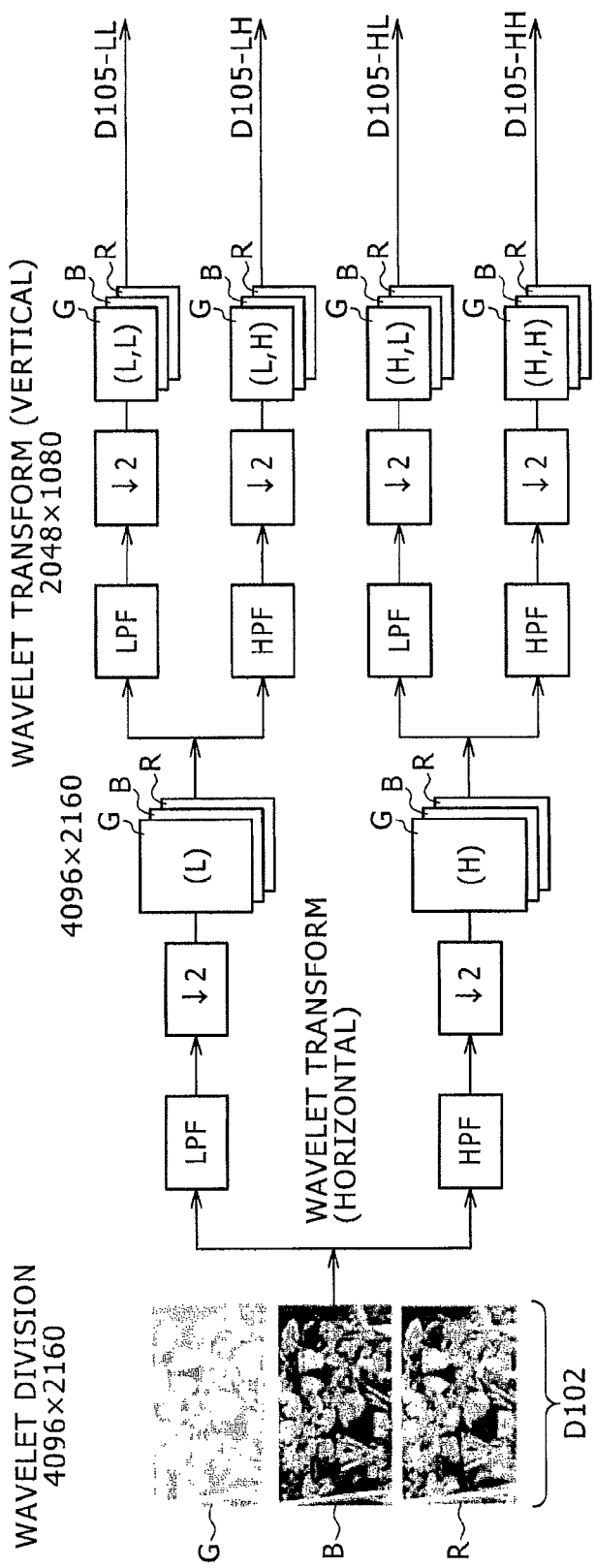

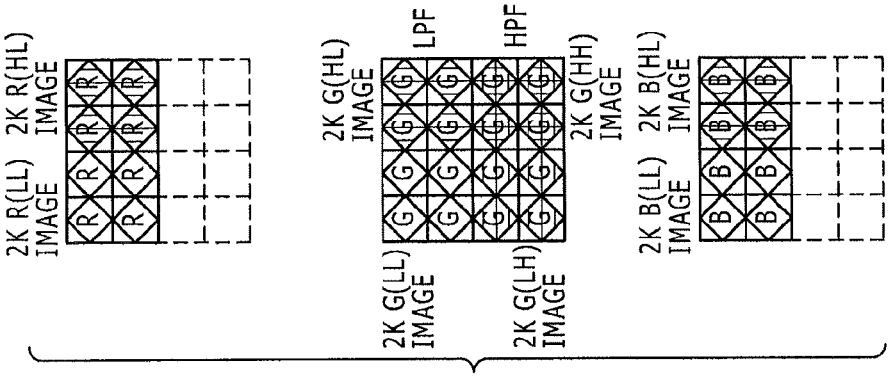
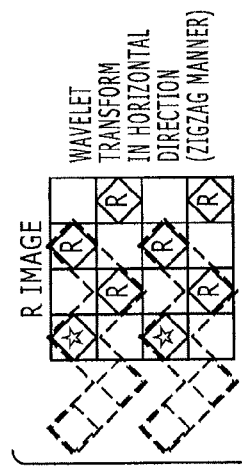
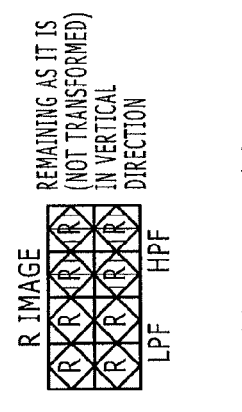
FIG.11A FIG.11B FIG.11C FIG.11D

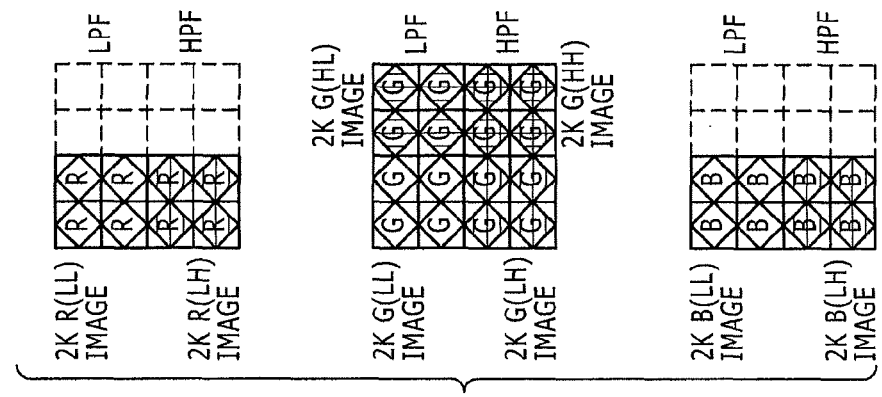
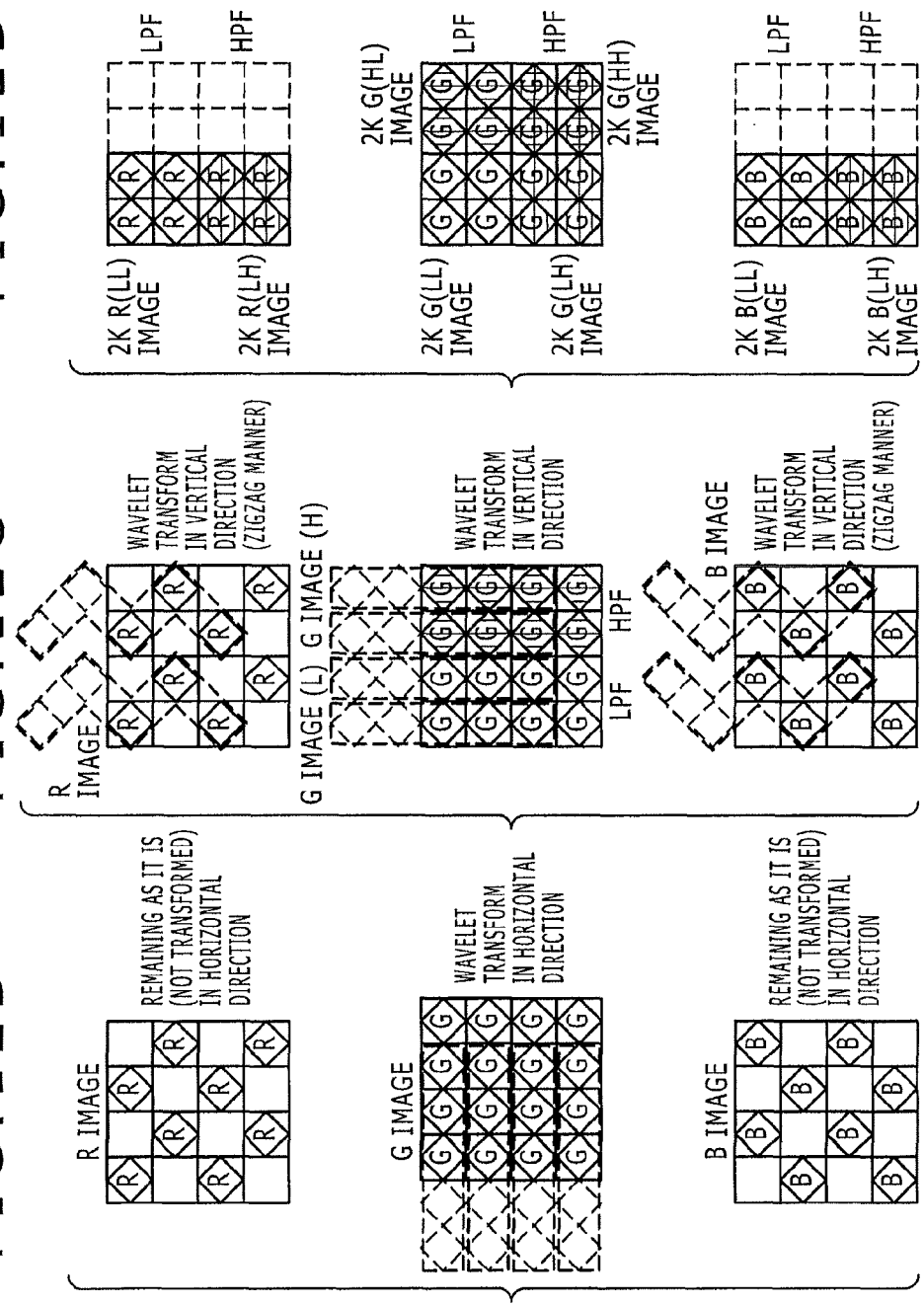
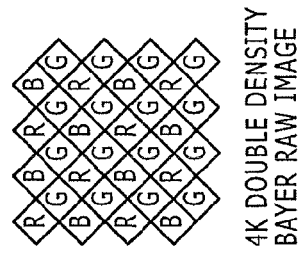

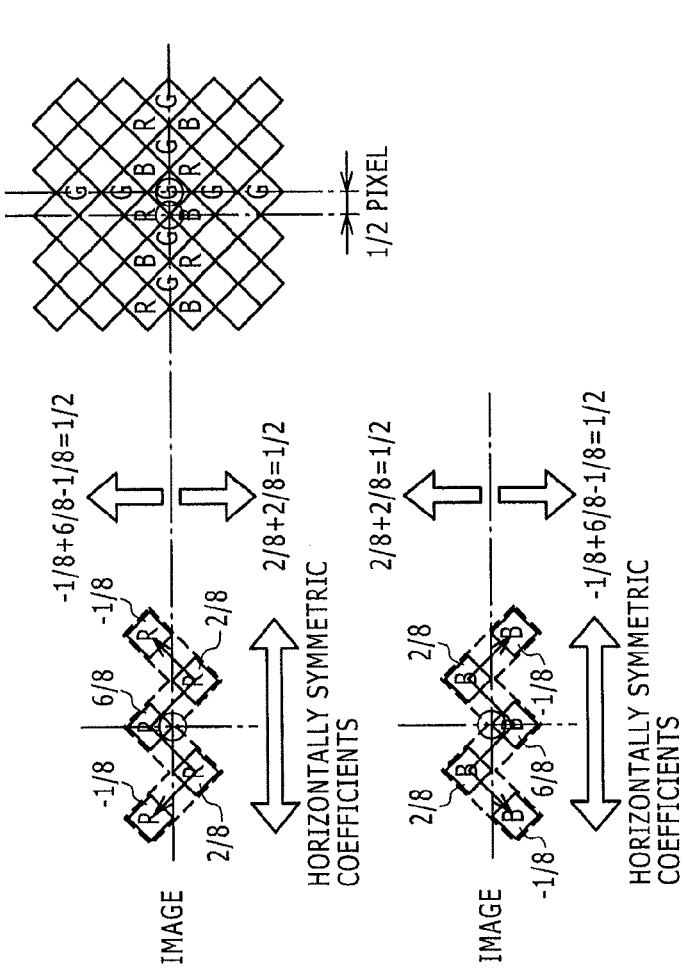
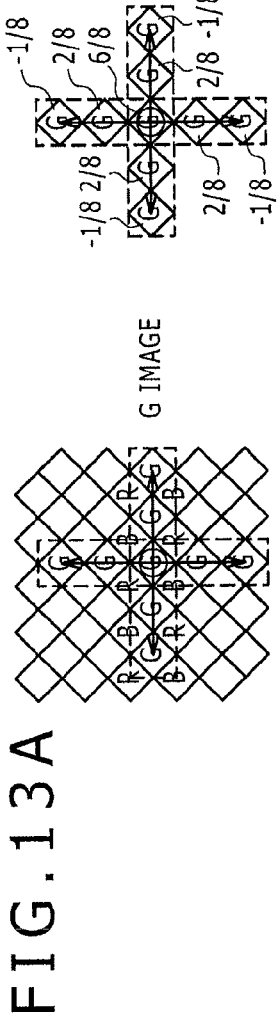
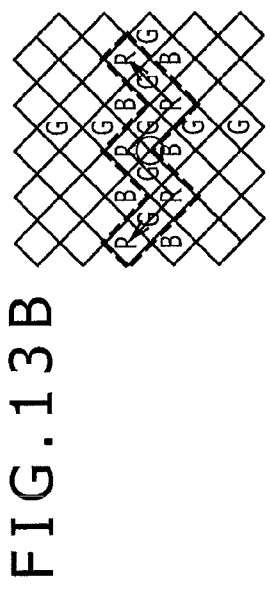
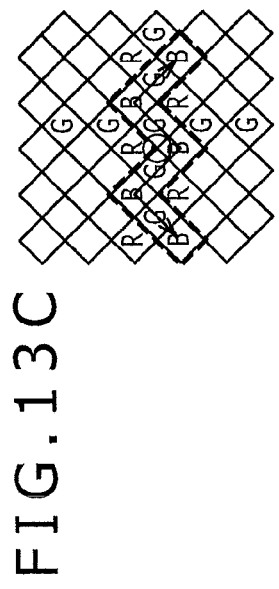
FIG. 13A  FIG. 13B  FIG. 13C

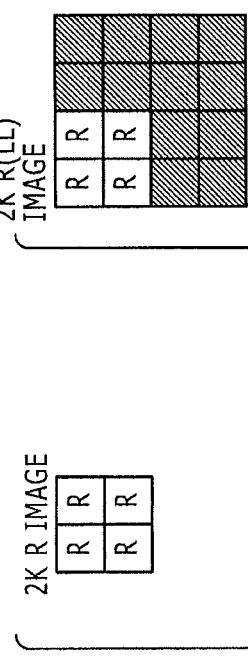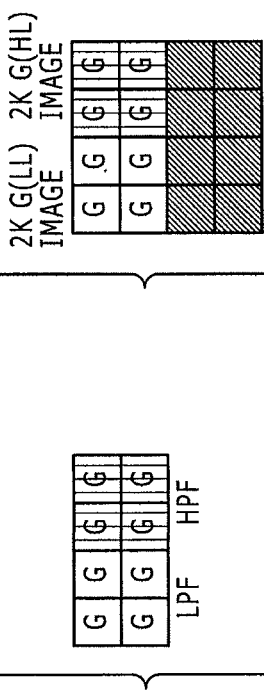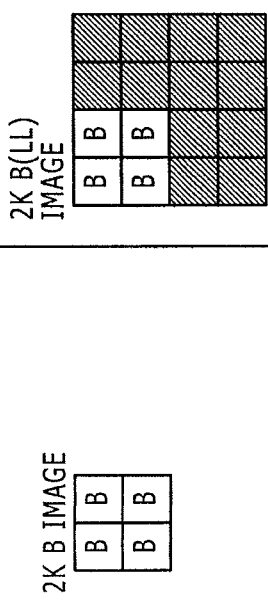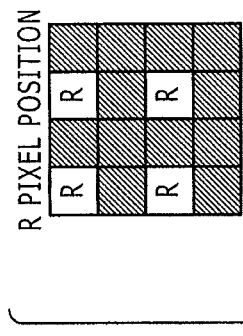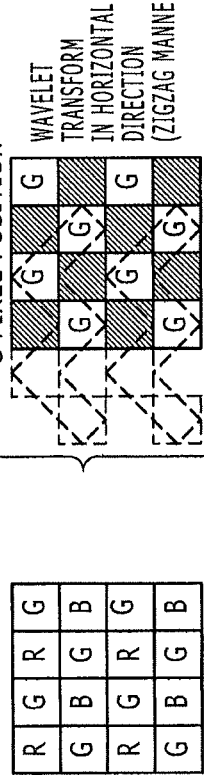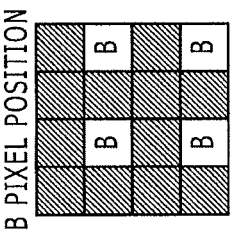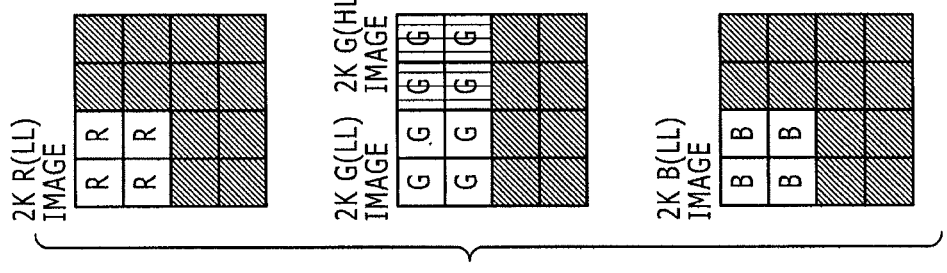
FIG.15A FIG.15B FIG.15C FIG.15D

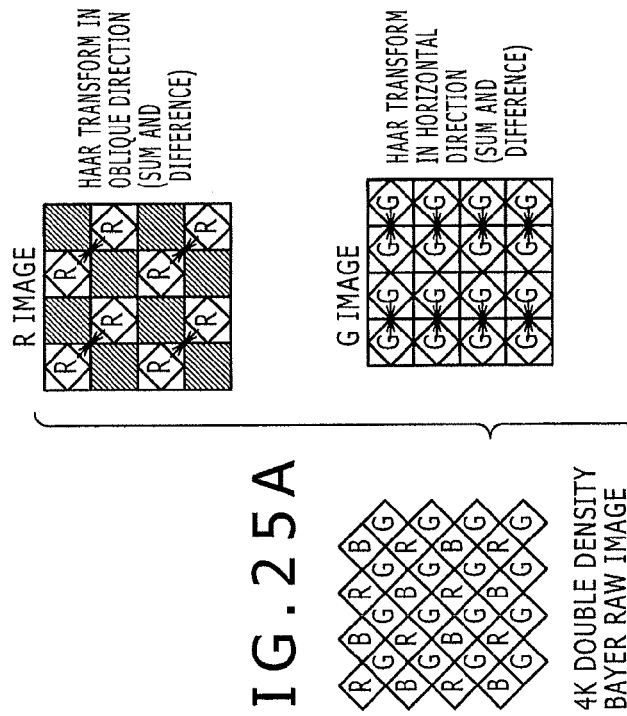
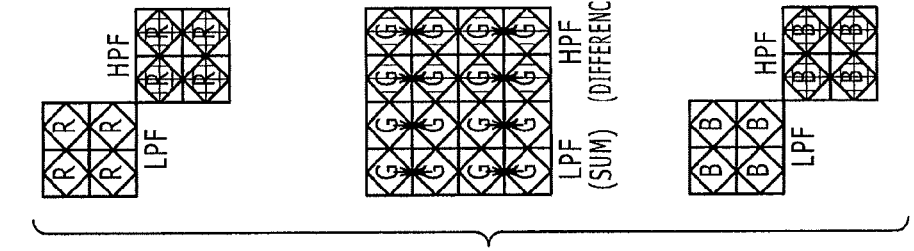
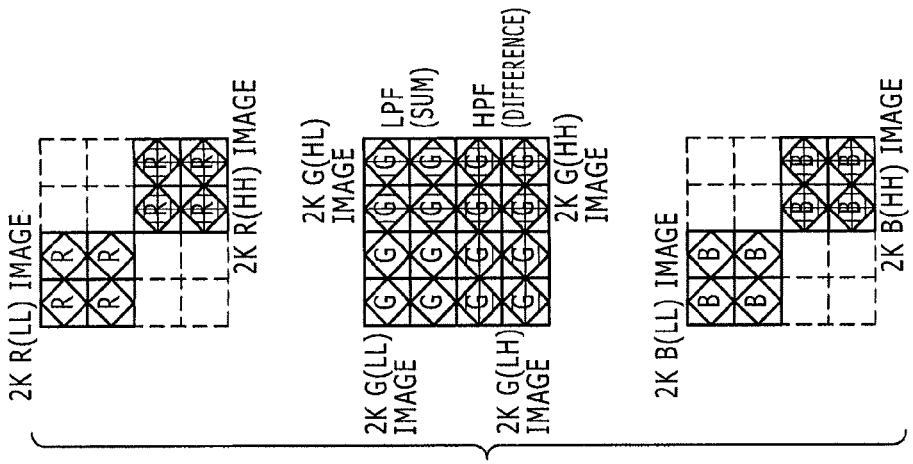
FIG.25A FIG.25B FIG.25C FIG.25D

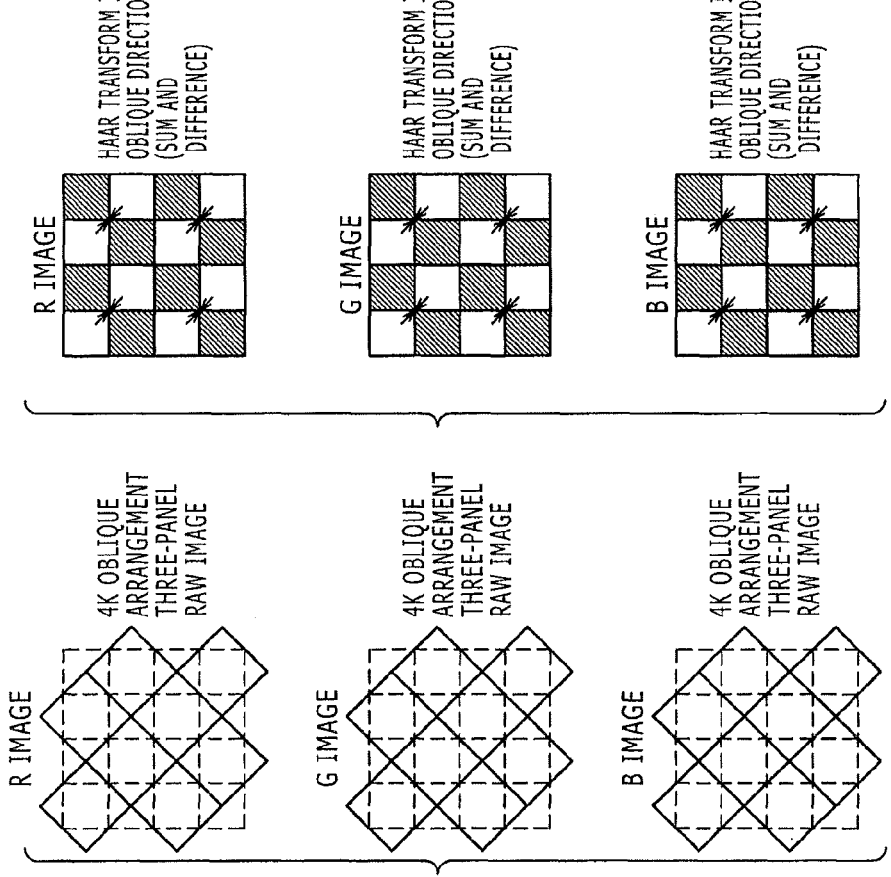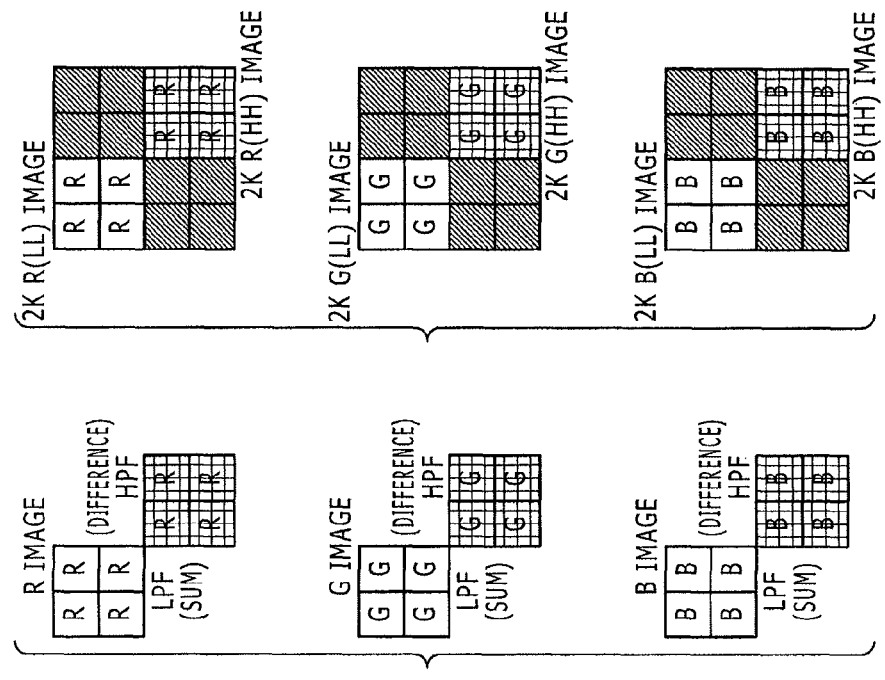

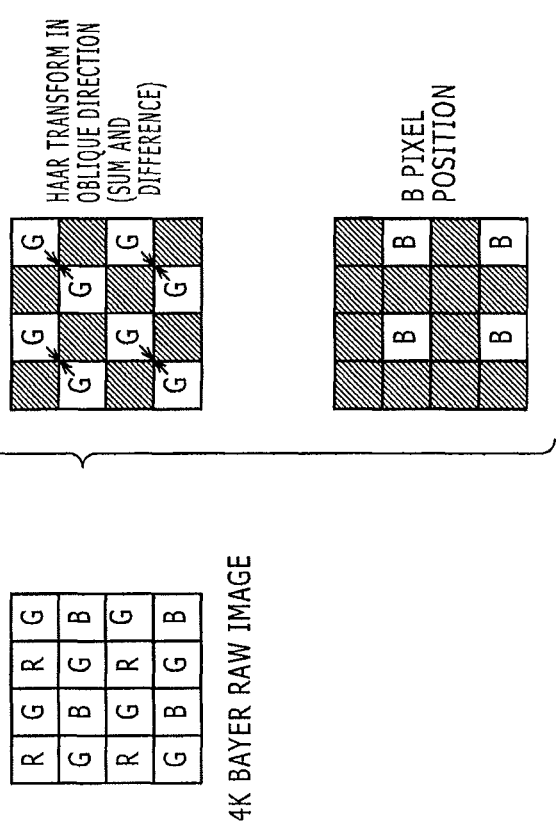

IMAGE PROCESSING DEVICE, IMAGE PROCESSING METHOD, AND IMAGE PICKUP DEVICE

This is a division of application Ser. No. 12/965,194, filed Dec. 10, 2010, which is entitled to the priority filing date of Japanese application(s) 2009-288074, filed on Dec. 18, 2009, the entirety of which is incorporated herein by reference.

BACKGROUND OF THE INVENTION

1. Field of the Invention

The present invention relates to an image processing device, an image processing method, and an image pickup device suitably applied for efficient compression coding of RAW data obtained from image pickup elements of various kinds of arrangement systems, for example.

2. Description of the Related Art

An image pickup device using an image pickup element of a Bayer arrangement is generally known in the past. Such an image pickup element captures image light of a subject via a color filter, and outputs an image signal according to the intensity of the image light. Then, a subsequent processing section subjects the image signal to predetermined processing, whereby the image pickup device can display an image on a viewfinder or an external display device.

Japanese Patent Laid-Open No. 2002-247376 (hereinafter referred to as Patent Document 1) describes compression of RAW data (image data before color interpolation) obtained from an image pickup element of the Bayer arrangement as it is by JPEG (joint photographic experts group) or the like.

Japanese Patent Laid-Open No. 2003-125209 (hereinafter referred to as Patent Document 2) describes techniques for separately performing image compression of each of components of G1, G2, R, and B and a concrete example using wavelet compression as methods for compressing RAW data obtained from an image pickup element of the Bayer arrangement.

SUMMARY OF THE INVENTION

The pixel positions of green pixels are alternately, shifted from each other in a horizontal direction and a vertical direction in the past. Thus, the green pixels are divided into two components of G1 and G2 so that the pixel positions are not shifted from each other, and then compressed. This compression is performed after pixels originally having strong correlation therebetween as one image are separated into separate pictures by sub-sampling. Thus, the correlation between the separated images cannot be used, and compression efficiency is decreased.

A wavelet transform in particular can achieve a very high compression efficiency by subband division of an entire picture. However, the existing system separates the entire picture into separate pictures, and thus does not exert the inherently high compression efficiency of the wavelet transform.

In addition, images of different resolutions can be obtained from one compression code by repeating subband division using a wavelet transform. When an image of half of a certain resolution of an image is displayed on a viewfinder or the like by the techniques described in Patent Document 2, for example, only one of two divided green images is used. In this case, a simple "pixel discrete reduction" is performed, and the image displayed on the viewfinder is affected by aliasing noise, for example. Thus, the advantages of using a wavelet transform cannot be fully enjoyed.

In addition, the existing techniques relate to a method of compressing RAW data obtained from an image pickup element of a Bayer arrangement, but do not relate to techniques for compressing RAW data obtained from an image pickup element of a double density Bayer arrangement or a three-panel image pickup element system having pixels arranged in an oblique direction.

Thus, different compression systems need to be used for different pixel arrangements of image pickup elements, and hardware cannot be shared.

In addition, Patent Document 1 discloses a technique for performing compression and recording without color separation into RGB full pixels. This technique compresses image data as it is without an increase in data rate due to color separation, and thus has an advantage of being able to control the data rate. However, details on how to compress image data are not clear. If image data is literally compressed as one image as it is in a Bayer arrangement, the level of each of RGB pixels differs in many natural images. Then, because adjacent pixels are differently painted into RGB, very large high-frequency components occur, and compression efficiency is not increased. In other words, very high compression noise is expected.

It is desirable to perform efficient compression coding of RAW data obtained from an image pickup element of a pixel arrangement in which pixel positions of at least one color of three primary colors are alternately shifted from each other in a horizontal direction or a vertical direction.

The present invention performs subband division of image data of a color whose pixel positions are alternately shifted from each other, which image data is included in image data output from an image pickup element of a pixel arrangement in which pixel positions of at least one color of three primary colors are alternately shifted from each other in a horizontal direction or a vertical direction. This subband division is performed with pixels of two upper and lower lines adjacent to each other or pixels of two left and right columns adjacent each other as a unit.

According to the embodiment of the present invention, even when pixel positions are alternately shifted from each other in a horizontal or vertical direction, subband division is performed with pixels of two upper and lower lines adjacent to each other or pixels of two left and right columns adjacent each other as a unit. Thus, by performing compression coding with the pixel positions remaining shifted from each other, efficient compression coding can be performed.

According to the embodiment of the present invention, it is possible to perform efficient compression coding of image data (RAW data) obtained from an image pickup element of a pixel arrangement in which pixel positions of at least one color of three primary colors are alternately shifted from each other in a horizontal direction or a vertical direction.

BRIEF DESCRIPTION OF THE DRAWINGS

FIG. 6 is a block diagram of the compression and decompression processing section at a time of compression decoding;

FIGS. 7A, 7B, and 7C are diagrams of the related art;

FIGS. 8A, 8B, 8C, and 8D are diagrams in which the related art is applied to a double density Bayer arrangement;

FIG. 9 is a diagram of processing of a compression and decompression I/F section at a time of a wavelet transform;

FIGS. 11A, 11B, 11C, and 11D are diagrams of wavelet transform processing of the compression and decompression I/F section for the double density Bayer arrangement;

FIGS. 12A, 12B, 12C, and 12D are diagrams of another example of wavelet transform processing of the compression and decompression I/F section for the double density Bayer arrangement;

FIGS. 13A, 13B, 13C, and 13D are diagrams showing pixel barycentric positions of subband images after a wavelet transform;

FIGS. 15A, 15B, 15C, and 15D are diagrams of wavelet transform processing of the compression and decompression I/F section for a Bayer arrangement;

FIGS. 25A, 25B, 25C, and 25D are diagrams showing an example in which the compression and decompression I/F section performs a Haar transform for the double density Bayer arrangement;

FIGS. 26A, 26B, 26C, and 26D are diagrams showing an example in which the compression and decompression I/F section performs a Haar transform for the oblique arrangement three-panel system; and FIGS. 27A, 27B, 27C, and 27D are diagrams showing an example in which the compression and decompression I/F section performs a Haar transform for the Bayer arrangement.

DETAILED DESCRIPTION OF THE PREFERRED EMBODIMENTS

Figure 1:
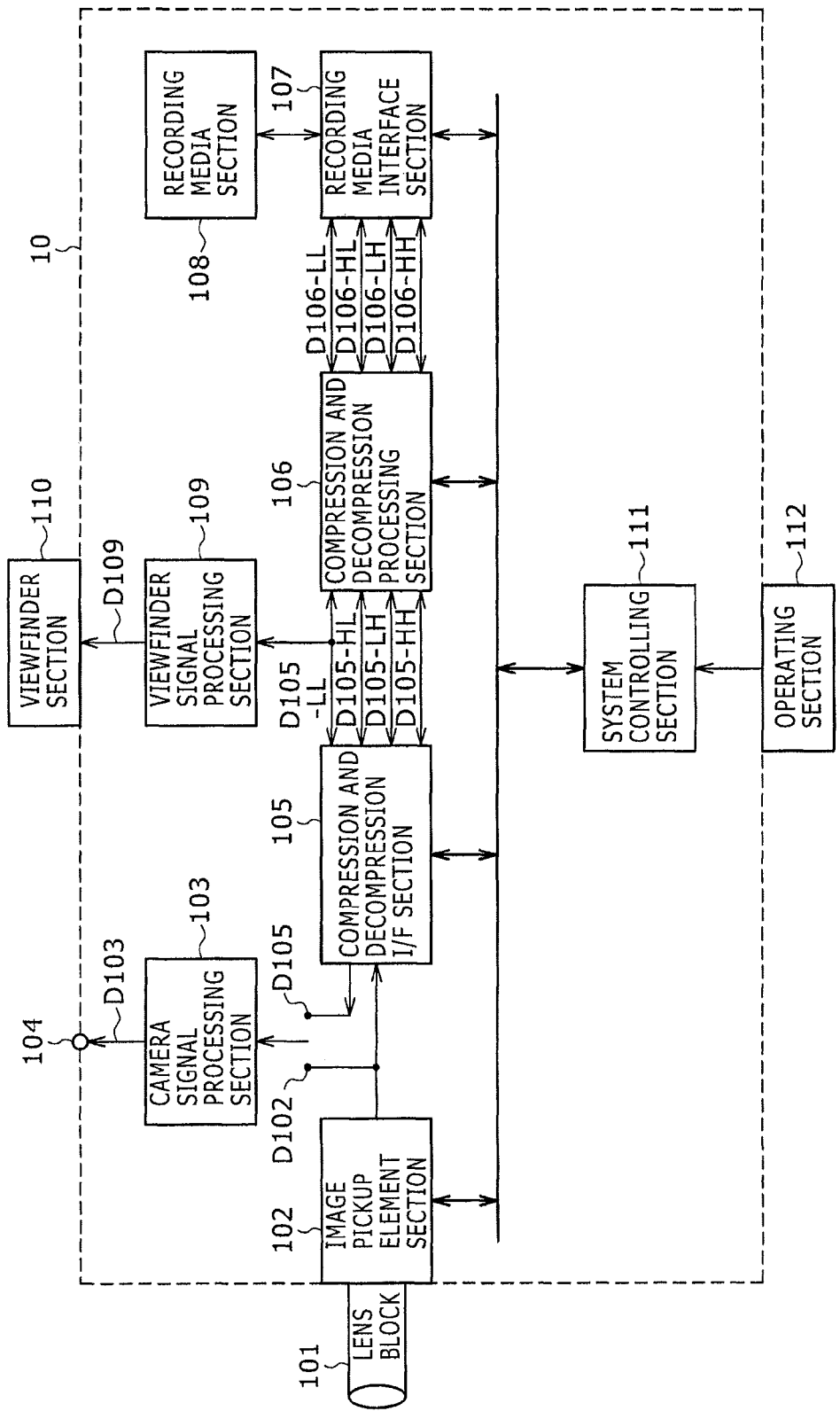
FIG. 1 is a diagram showing an image pickup device according to an embodiment of the present invention.

The best mode for carrying out the invention (which best mode will hereinafter be referred to as embodiments) will hereinafter be described. Incidentally, description will be made in the following order.

1. First Embodiment (Control of Compression Coding or Decoding: Example Using Wavelet Transform)

2. Second Embodiment (Control of Compression Coding or Decoding: Example Using Haar Transform)

3. Examples of Modification

<1. First Embodiment>

[Example of Compression-Coding or Decoding Image Using Wavelet Transform]

A first embodiment of the present invention will hereinafter be described with reference to FIGS. 1 to 24.

In the embodiment below, description will be made of an example applied to an image pickup device 10 that efficiently compression-codes each of three R/G/B components in any RAW data obtained from an image pickup element of a Bayer arrangement without RGB full pixels, an image pickup element of a double density Bayer arrangement without RGB full pixels, or an image pickup system using three image pickup elements having pixels arranged in an oblique direction without RGB full pixels. Three component signals including elements of RGB pixels will hereinafter be abbreviated to "three R/G/B components."

The image pickup device 10 according to the present example can realize compression coding without decreasing compression efficiency even when pixel positions are alternately shifted from each other in a horizontal direction or a vertical direction because of absence of real pixels, by performing compression coding with the pixel positions remaining shifted from each other.

In this case, a discretely reduced image in which pixel positions are alternately shifted from each other in a horizontal direction or a vertical direction is averaged by being combined with a wavelet transform. Thus, a reduced subband image with half a resolution becomes an image having RGB full pixels.

That is, simple, so-called color separation (De-Bayer) processing by a wavelet transform is performed, and display can be made on a monitor not shown in the figure which monitor is provided to the image pickup device 10. This is because images of different resolutions can be obtained from identical image data when a wavelet transform is used. Even RAW data obtained from an image pickup element that needs color separation such as Bayer color separation or the like is subjected to a wavelet transform, and thus can be easily displayed on the monitor or the like.

When an image obtained from an image pickup element of RGB full pixels is wavelet-transformed, each of RGB is subband-divided into four images, and the image is resolved into a total of 12 subband images of RGB. When a compression coding method according to the present example is used, RAW data can be treated as differences in the number of subband images after a wavelet transform. For example, RAW data obtained from a Bayer arrangement can be treated as four subband images, RAW data obtained from a double density Bayer arrangement can be treated as eight subband images, and RAW data obtained from a three-panel image pickup element system having pixels arranged in an oblique direction can be treated as six subband images. Thus, compression coding processing after a wavelet transform can be realized as common processing.

In addition, a high-resolution image such as a 4K image or the like has a massive amount of data to be handled, and would therefore require some parallel processing when real-time processing is performed. However, a high-resolution image such as a 4K image or the like can be treated as differences in the number of subband images as described above by using the compression coding method according to the present example. Thus, a necessary number of processing blocks can be operated in parallel with each other as processing after an image is subband-divided, and operating speed can be reduced by an amount corresponding to a degree of parallelism. In addition, as will be described later, same effects can be obtained with not only a wavelet transform but also a Haar transform for simple hardware. Incidentally, 4K denotes an example of specifications for high resolution such as 4096 samples×2160 lines. 2K denotes an example of specifications for lower resolution than 4 k such as 2048 samples×1080 lines.

FIG. 1 shows an example of the image pickup device 10 handling a 4K image and a 2K image.

The image pickup device 10 is an example of an image pickup device capable of image compression/decoding according to an embodiment of the present invention.

A lens block 101 controls a diaphragm and a zoom, and forms an optical image on an image pickup element section 102.

Figure 2:
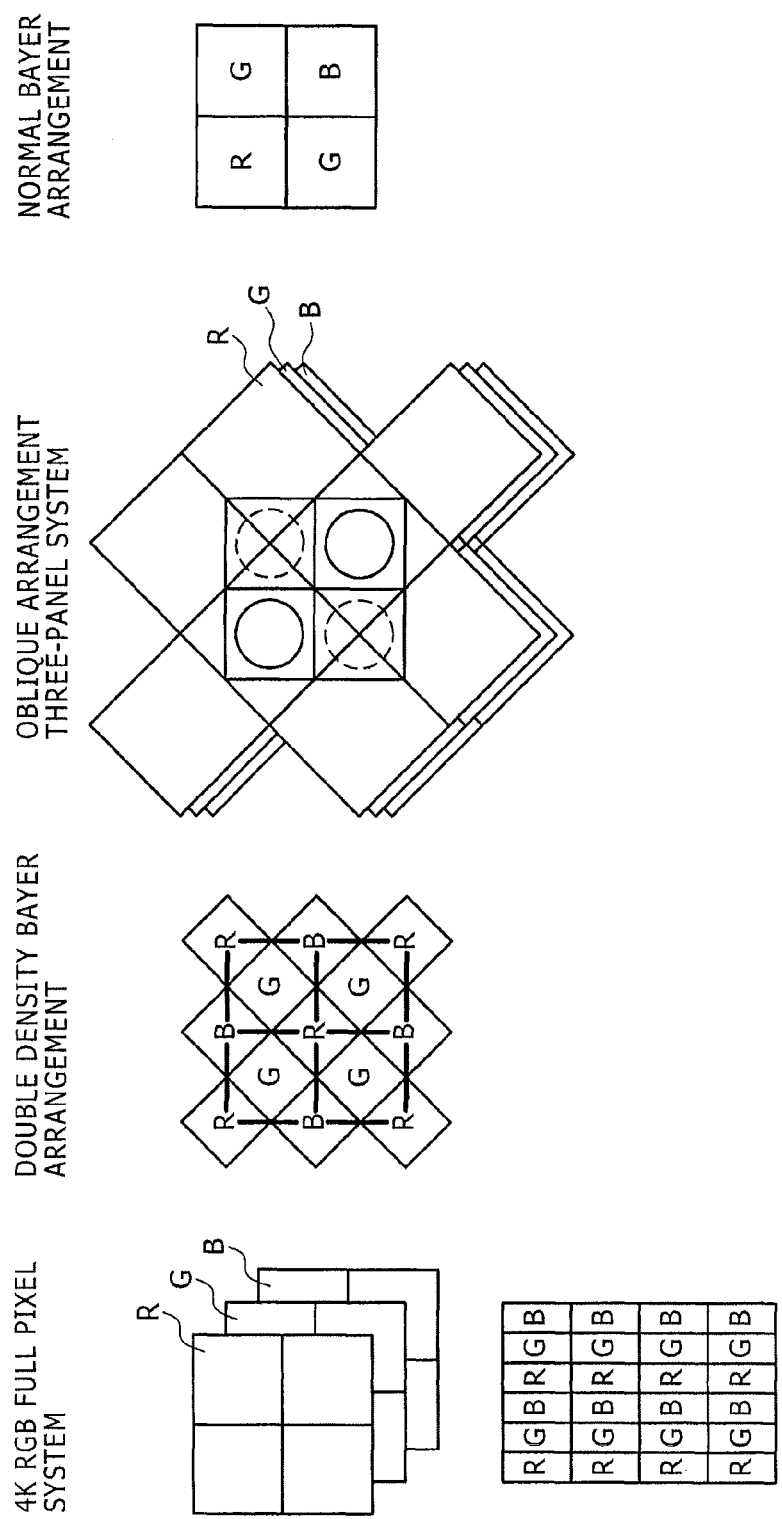
FIG. 2 is a diagram showing an example of pixel arrangements of image pickup elements.

The image pickup element section 102 converts the optical image input from the lens block 101 into a digital video signal, and outputs recording RAW data (D102). In the present example, provision can be made for any of image pickup elements having pixel arrangements as shown in FIG. 2 as image pickup elements.

<RGB Full Pixel System>
  An RGB three-panel system in which light is separated into RGB using an optical prism
  A single-panel system of such a structure as to have light wavelength sensitivity in a direction of depth of a sensor
  A single-panel system in which one pixel is painted differently into three RGB stripes as in a liquid crystal TV
<Double Density Bayer Arrangement>
  A normal Bayer arrangement is doubled in pixel density, and is disposed obliquely at 45°. Thus, full pixels are obtained for G, and R pixels and B pixels are arranged in such a pixel arrangement as to be spaced in an oblique direction (a thick frame in FIG. 2 indicates pixels in a normal Bayer arrangement).
<Oblique Arrangement Three-Panel System>
  A pixel arrangement having pixels arranged obliquely at 45° as one image pickup element and assuming that pixel interpolation is performed between two pixels or four pixels adjacent to each other in a horizontal direction or a vertical direction to interpolate pixels indicated by a dotted line circle in a thick frame in FIG. 2 (pixels in a normal Bayer arrangement).
  A system performing image pickup using three image pickup elements in combination with an optical prism
  Or a single-panel system having the above-described pixel arrangement and having such a structure as to have light wavelength sensitivity in a direction of depth of a sensor
<Bayer Arrangement>
  A so-called normal Bayer arrangement
  A camera signal processing section 103 performs predetermined processing on the recording RAW data (D102) output by the image pickup element section 102 of the Bayer arrangement or the like and reproduced RAW data (D105) read from a recording media section 108 and subjected to decompression processing to be described later. Specifically, the camera signal processing section 103 creates a RGB full 4K image (so-called color separation) so that the RGB full 4K image can be recognized as an image, makes camera image adjustment for a white balance, brightness and the like, and outputs a recording and reproduced 4K image (D103) to a monitor-out section 104.

The monitor-out section 104 outputs the video signal of the 4K image to an external 4K monitor or the like.

A compression and decompression I/F section 105 resolves the recording RAW data (D102) from the image pickup element of the Bayer arrangement or the like into subband images in a 2K band by a wavelet transform. The compression and decompression I/F section 105 functions as a subband dividing section for subjecting image data of a color whose pixel positions are alternately shifted from each other, which image data is included in image data output from an image pickup element of a pixel arrangement in which pixel positions of at least one color of three primary colors are alternately shifted from each other in a horizontal direction or a vertical direction, to subband division with pixels of two upper and lower lines adjacent to each other or pixels of two left and right columns adjacent to each other as a unit.

The compression and decompression I/F section 105 scans the pixels of the image data of the color whose pixel positions are alternately shifted from each other with two upper and lower lines adjacent to each other as a unit, and performs a wavelet transform in the horizontal direction. Alternatively, the compression and decompression I/F section 105 scans the pixels of the image data of the color whose pixel positions are alternately shifted from each other with two left and right columns adjacent to each other as a unit, and performs a wavelet transform in the vertical direction.

In the present example, the compression and decompression I/F section 105 outputs the following subband images.

A subband image in the 2K band as a low-frequency component in both the horizontal direction and the vertical direction is output as D105-LL.

A subband image in the 2K band as a high-frequency component in the horizontal direction and a low-frequency component in the vertical direction is output as D105-HL.

A subband image in the 2K band as a low-frequency component in the horizontal direction and a high-frequency component in the vertical direction is output as D105-LH.

A subband image in the 2K band as a high-frequency component in both the horizontal direction and the vertical direction is output as D105-HH.

Depending on the pixel arrangement of the image pickup element section 102, there is a case where not all the subband images HL/LH/HH in the 2K band for each of RGB are output and some subband images are not output. Details will be described separately.

In addition, subband images in the 2K band (D105-LL/HL/LH/HH) read from the recording media section 108 and subjected to decompression processing are subjected to an inverse wavelet transform, and then output as reproduced RAW data (D105). This will also be described in detail separately.

A compression and decompression processing section 106 image-compresses each of the subband images in the 2K band (D105-LL/HL/LH/HH) using a compression coding system, and outputs the compressed subband images as corresponding code streams (D106-LL/HL/LH/HH).

Because the compression and decompression I/F section 105 uses a wavelet transform, it is most desirable that the compression and decompression processing section 106 adopt JPEG2000 or the like using the same wavelet transform. However, the compression and decompression processing section 106 may use another existing image compression system.

In addition, the compression and decompression processing section 106 decompresses each piece of subband image compressed data recorded in the recording media section 108, and outputs the decompressed data as reproduced subband images in the 2K band (D1 -LL/HL/LH/HH). At this time, the compression and decompression processing section 106 functions as a compression coding section for compression-coding image data output from the compression and decompression I/F section 105 in parallel in each band divided by the compression and decompression I/F section 105 and in each of the three primary colors.

A recording media interface section 107 makes fast access to recording media, and interfaces to read and write compressed image data.

The recording media section 108 is recording media for recording and reproducing compressed image data. A non-volatile memory such as a flash memory or the like is applied to the recording media section 108.

A viewfinder signal processing section 109 is an example of a display signal outputting section for outputting an input image as a display signal for display on a display system. The subband image D105-LL of the subband images in the 2K band is a subband image of low frequencies in both the horizontal direction and the vertical direction, and can therefore be monitored as an RGB full image of 2K size. In this manner, camera image adjustment for a white balance, brightness and the like can be made in 2K as in the camera signal processing section 103. Further, the viewfinder signal processing section 109 generates setting information for photographing, performs a peaking process for facilitating focusing and the like, and outputs a recording and reproduced 2K image (D109) to a viewfinder section 110.

The viewfinder section 110 displays the recording and reproduced 2K image (D109) from the viewfinder signal processing section 109.

A system controlling section 111 has a controlling software program, and controls the whole of the image pickup device 10 according to the program. In addition, in response to input from an operating section 112, the system controlling section 111 connects each block to a data bus, exchanges data, and controls settings and a state for photographing.

The operating section 112 receives an operation on the image pickup device 10, and transmits the operation as an electric signal to the system controlling section 111.

As already described, the compression and decompression I/F section 105 uses a wavelet transform. Thus, description will first be made of the compression and decompression processing section 106 performing compression and decompression using the same wavelet transform.

Figure 3:
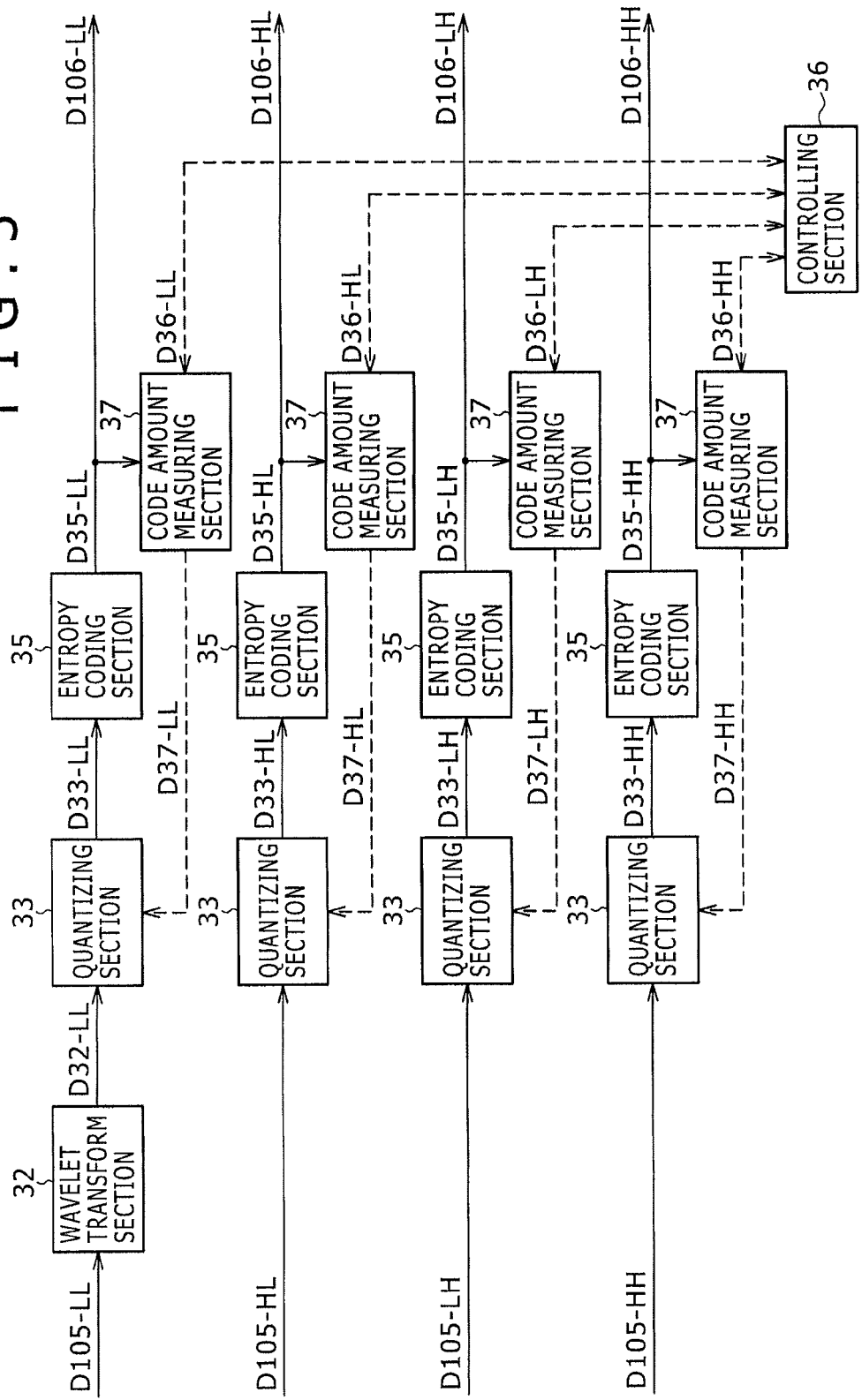
FIG. 3 is a block diagram of a compression and decompression processing section at a time of compression coding.

FIG. 3 is a detailed block diagram of the compression and decompression processing section 106 at a time of compression coding.

A wavelet transform section 32 subjects the subband image D105-LL in the 2K band to a wavelet transform, and then outputs a wavelet transform coefficient D32-LL.

The wavelet transform section 32 is generally realized by a filter bank including a low-pass filter and a high-pass filter. Incidentally, a digital filter generally has an impulse response of a length of a plurality of taps (filter coefficients), and thus an input image or coefficients sufficient for performing filtering needs to be buffered in advance. Also in a case of performing a wavelet transform in multiple stages, wavelet transform coefficients generated in a preceding stage which coefficients are necessary to perform filtering need to be buffered in advance.

Subband images generated by a wavelet transform will be described below.

Figure 4:
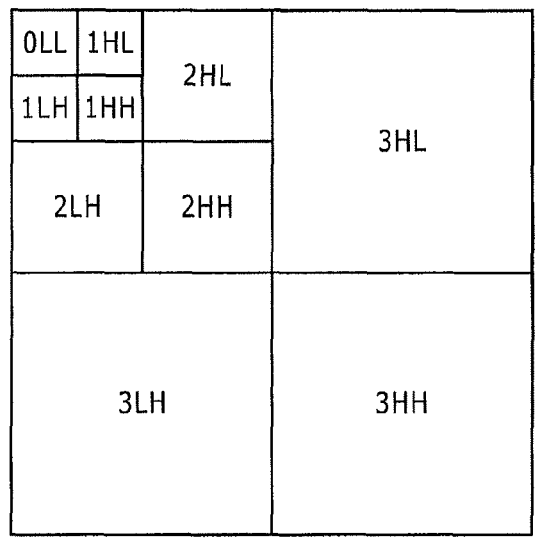
FIG. 4 is a diagram illustrating a division level of a wavelet transform.
Figure 5A:
FIGS. 5A and 5B are diagrams illustrating division levels of a wavelet transform.
Figure 5B:
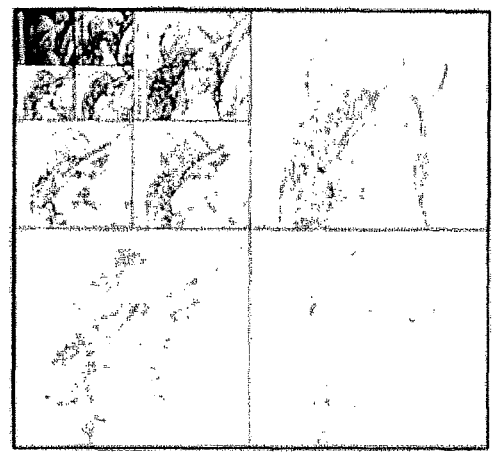

FIG. 4 shows an example of subband images. Generally, in this wavelet transform, as shown in FIG. 4, low-frequency components are repeatedly transformed and divided. This is because much of the energy of an image concentrates in the low-frequency components. This is clear also from a fact that subband images are formed as a division level is advanced from a division level=1 shown in FIG. 5A to a division level=3 shown in FIG. 5B.

The division level of a wavelet transform in FIG. 4 is 3, and a total of 10 subband images are formed as a result of the wavelet transform. In this case, L and H in FIG. 4 denote low frequencies and high frequencies, respectively, and a number in front of L or H indicates a division level. Specifically, 1LH, for example, denotes a subband image at a division level=1 which subband image has low frequencies in the horizontal direction and has high frequencies in the vertical direction.

A return will be made to the description of FIG. 3. The wavelet transform coefficient D32-LL is next quantized by a quantizing section 33. Then a quantized coefficient D33-LL is output. It suffices to use scalar quantization, which is also used in JPEG2000, for a quantizing section in this case. As shown in (Equation 1) below, it suffices to set a value obtained by dividing a wavelet transform coefficient W by a quantization step size D as the value of a quantized coefficient q.

$$q = W/\Delta \qquad \text{(Equation 1)}$$

The quantization step size Δ37-LL is supplied from a code amount measuring section 37 to be described later.

The quantized coefficient D33-LL is next output to an entropy coding section 35. The entropy coding section 35 compresses the quantized coefficient D33-LL using an arbitrary information source compressing section. It suffices to adopt, as an entropy coding section, commonly used Huffman coding (a system adopted in MPEG and JPEG, which system generates code referring to a Huffman coding table created according to the frequency of occurrence of symbols appearing in data in advance) or arithmetic coding (a system adopted in H.264 and JPEG2000). In addition, at that time, though not described in detail herein, the quantized coefficient may be combined with EBCOT (Embedded Block Coding with Optimal Truncation) as entropy coding in bit plane units as in JPEG2000.

A result coded by the entropy coding section 35 is output as a coded code stream D35-LL to become the output D106-LL of the compression and decompression processing section 106, and is also input to the code amount measuring section 37.

The code amount measuring section 37 compares amounts of code of the coded code stream D35-LL within one frame with a target code amount D36-LL supplied from a controlling section 36 while accumulating the amounts of code of the coded code stream D35-LL within one frame. When the accumulation of the amounts of code of the coded code stream D35-LL within one frame is likely to exceed the target code amount, the code amount measuring section 37 changes the quantization step size D37-LL for the quantizing section 33 to a size larger by one step.

Conversely, when the accumulation of the amounts of code of the coded code stream D35-LL within one frame is likely to be less than the target code amount, the code amount measuring section 37 changes the quantization step size D37-LL for the quantizing section 33 to a size smaller by one step.

The above is the description of operation of the compression and decompression processing section 106 at the time of compression coding. However, not only the subband image LL component in the 2K band but also the HL component, the LH component, and the HH component are input to the compression and decompression processing section 106.

The wavelet transform section 32 may also be used for the HL/LH/HH component as for the LL component to raise the division level. However, in the example of FIG. 3, a wavelet transform at a first level has already been performed in the compression and decompression I/F section 105. Thus, a mode of repeatedly transforming and dividing only the subband image D105-LL of the low-frequency components is adopted according to a common wavelet transform utilizing a property such that much of the energy of the image shown in FIG. 4 concentrates in the low-frequency components.

Incidentally, there is a case where for example hardware can realize processing from the wavelet transform to entropy coding as one circuit. In this case, no limitation is imposed on forming the compression and decompression processing section 106 using four existing circuits in parallel with each other without taking the trouble to develop a new circuit not performing a wavelet transform.

In the example of FIG. 3, only quantization and entropy coding are performed and the wavelet division level is not raised for the subband images D105-HL, D105 -LH, and D105-HH in the 2K band other than the LL component.

Then, the subband images D105-HL, D105-LH, and D105-HH in the 2K band other than the LL component are output as coded code streams D35-HL, D35-LH, and D35-HH, respectively. Then, the coded code streams D35-HL, D35-LH, and D35-HH become the outputs D106-HL, D106-LH, and D106 -HH of the compression and decompression processing section 106. In addition, code amount measuring sections 37 compare amounts of code of the respective coded code streams within one frame with target code amounts D36-HL, D36-LH, and D36-HH supplied from the controlling section 36 while accumulating the amounts of code of the respective coded code streams within one frame. As for the LL component, when the amounts of code of the respective coded code streams within one frame are likely to exceed the target code amounts, the code amount measuring sections 37 change quantization step sizes for quantizing sections 33 to a size larger by one step. Conversely, when the accumulations of the amounts of code of the respective coded code streams within one frame are likely to be less than the target code amounts, the code amount measuring sections 37 change the quantization step sizes for the quantizing sections 33 to a size smaller by one step.

The amounts of code for the respective subband images in the 2K band are controlled as described above.

In the above description, the controlling section 36 sets the target code amounts for the respective subband images in the 2K band in the respective corresponding code amount measuring sections 37 in advance. However, for example, information on code amount accumulation conditions may be sent from each code amount measuring section 37 to the controlling section 36, and the target code amount for each subband may be accommodated and changed according to the code amount accumulation conditions of each of the code amount measuring sections 37. Because a natural image can include a large amount of low-frequency components or conversely include a large amount of high-frequency components, optimum code amount control can be performed according to the properties of the image.

The above is the description of operation at the time of compression coding.

Next, FIG. 6 is a detailed block diagram of the compression and decompression processing section 106 at a time of compression decoding, and operation at the time of compression decoding will be described.

Entropy decoding sections 38 supplied with coded code streams D106-LL, D106-HL, D106-LH, and D106-HH perform decoding according to a section corresponding to the entropy coding described with reference to FIG. 3. Quantized coefficients D38-LL, D38-HL, D38-LH, and D38-HH are generated as a result of the entropy decoding.

The quantized coefficients D38-LL, D38-HL, D38-LH, and D38-HH are converted from the quantized coefficients D38-LL, D38-HL, D38-LH, and D38-HH to wavelet transform coefficients D39-LL, D39-HL, D39-LH, and D39-HH in dequantizing sections 39. A dequantizing section in this case performs an operation as the inverse of (Equation 1), and can be expressed by the following (Equation 2):

$$W = q \times \Delta \quad \text{(Equation 2)}$$

(W is a wavelet transform coefficient, q is a quantized coefficient, and $\Delta$ is quantization step size.)

The wavelet transform coefficient D39-LL is restored to the subband image D105-LL in the 2K band of the LL component in an inverse wavelet transform section 40. Then the subband image D105-LL is output.

It is clear that when the subband images D105-HL, D105-LH, and D105-HH in the 2K band other than the LL component are also subjected to wavelet re-division at the time of coding, it suffices to provide an inverse wavelet transform section 40 for each subband to restore the wavelet transform coefficients D39-HL, D39-LH, and D39-HH to the respective subband images in the 2K band.

The above is the description of operation at the time of compression decoding.

The problems of the techniques described in existing Patent Document 2 will be summed up in the following with reference to FIGS. 7A to 7C.

FIG. 7A shows an example of a 4K Bayer RAW image using a normal Bayer arrangement.

Though there are 4K pixels, the 4K pixels are painted differently into RGB in the normal Bayer arrangement as shown in FIG. 7A, and only light wavelength components corresponding to RGB color filters are converted from light into an electric signal in the respective pixels. In the normal Bayer arrangement, G is arranged in a checkered (checkered flag) pattern.

FIG. 7B shows an example of four color components of R pixels, G1 pixels, G2 pixels, and B pixels obtained by separating the pixels of the 4K Bayer RAW image.

In the techniques described in Patent Document 2, the 4K Bayer RAW image described above is perceived as the four color components of R pixels, G1 pixels, G2 pixels, and B pixels.

FIG. 7C shows an example in which the four color components shown in FIG. 7B are collected for different pixels.

In the techniques described in Patent Document 2, the pixels included in the color components shown in FIG. 7B are collected to form a 2K R image, a 2K G1 image, a 2K G2 image, and a 2K B image, and the 2K R image, the 2K G1 image, the 2K G2 image, and the 2K B image are each subjected to compression coding using a wavelet transform and then recorded.

The G1 pixels and the G2 pixels are originally adjacent to each other in an oblique direction, and it is known that the G1 pixels and the G2 pixels have very high correlation therebetween. Nevertheless, the techniques described in Patent Document 2 take the trouble to compression-code the G1 image and the G2 image as if the G1 image and the G2 image were two independent images (or two color components), thus decreasing compression efficiency. Although the wavelet transform in particular achieves high compression efficiency in that an entire screen is converted into subbands, it is difficult to say that a combination of the existing techniques and the wavelet transform enjoys a high compression ratio inherent in the wavelet transform.

In addition, as shown in FIG. 7B, "discrete reduction" due to sub-sampling of the G1 image and the G2 image is performed. It is thus obvious that when only the G1 image or the G2 image is displayed on a 2K monitor, aliasing occurs according to a sampling theorem. Accordingly, both the G1 image and the G2 image may be used to generate a 2K average image by signal processing and then display the 2K average image on the monitor, but it is necessary to access twice the data of 2K. However, the wavelet transform is subband division, and is thus intrinsically capable of enabling display on the monitor when only a 2K low-frequency component is accessed. Also in this respect, it is difficult to say that the techniques described in Patent Document 2 fully enjoy the advantages of the wavelet transform.

FIGS. 8A to 8D show an example of the existing techniques being applied to the double density Bayer arrangement.

In FIG. 8A, the normal Bayer arrangement is doubled in pixel density, and pixels are obliquely arranged at 45°.

In this arrangement, a G image is 4K full pixels and an R image and a B image are obliquely spaced but provide a 4K resolution in the horizontal direction and the vertical direction. The pixel density of the arrangement is twice that of the normal Bayer arrangement, and thus the arrangement will be referred to as a "double density Bayer arrangement" in the following description.

Consideration will now be given to a case of compressing a 4K RAW image using this double density Bayer arrangement according to the techniques described in Patent Document 2. In this case, unlike the Bayer arrangement, all 4K pixels are provided for G, while the R image and the B image are in a checkered pattern, as shown in FIG. 8B. Thus, as shown in FIG. 8C, the 4K RAW image is treated as five color components of R1 pixels, R2 pixels, G pixels (4K resolution), B1 pixels, and B2 pixels. Then, the pixels are collected as shown in FIG. 8D to form a 2K R1 image, a 2K R2 image, a 4K G image, a 2K B1 image, and a 2K B2 image. Each image is subjected to compression coding using a wavelet transform, and then recorded.

While only the G image is subjected to sub-sampling separation into two screens and then compressed in the Bayer arrangement, both the R image and the B image are subjected to sub-sampling separation into two screens in the double density Bayer arrangement. Further, in the Bayer arrangement, the G image of high pixel density is separated into two screens and thus originally has high pixel density even when the compression efficiency of the G image is decreased, and a balance can be attained with the compressed image quality of the R image and the B image of low pixel density.

In the double density Bayer arrangement, on the other hand, both the R image and the B image of low pixel density are further subjected to sub-sampling separation into two screens, and thus have low pixel density and are decreased in compression efficiency as well, and the balance with the compressed image quality of the G image is further disturbed.

In addition, as described in relation to the G image of the Bayer arrangement, there is a fear of occurrence of aliasing when the sub-sampled R image and the sub-sampled B image are displayed on a 2K monitor as they are.

On the other hand, the image pickup device 10 according to the present example can be expected to provide a great improvement utilizing the inherent features of the wavelet transform in relation to RAW data compression for the R image and the B image in the double density Bayer arrangement in particular. Further, pixel arrangements from the normal Bayer arrangement to RGB full pixels can be dealt with by a same method.

An example of processing at the time of a wavelet transform of the compression and decompression I/F section 105 will next be described with reference to FIG. 9.

The compression and decompression I/F section 105 can maximize the effect thereof when using a wavelet transform. Thus, though the compression and decompression I/F section 105 has the same basic configuration as the wavelet transform section 32 in the compression and decompression processing section 106, the processing of the compression and decompression I/F section 105 will be described anew with reference to FIG. 9.

Recording RAW data D102 is input as an input image of the compression and decompression I/F section 105. In this case, supposing that 4K RGB full pixels shown in FIG. 2 are input, three R/G/B components of 4096×2160 size are subjected to exactly the same processing.

First, the input image is subjected to a wavelet transform in the horizontal direction. The wavelet transform includes a low-pass filter (LPF) and a high-pass filter (HPF), which each perform 2:1 down sampling (indicated by a downward arrow and a FIG. 2 in FIG. 9). As a result, a low-frequency subband image (L) and a high-frequency subband image (H) of 2048×2160 size halved in the horizontal direction are obtained.

Next, the 2048×2160 low-frequency subband image (L) is subjected to a wavelet transform in the vertical direction. The wavelet transform performs 2:1 down sampling via each of a low-pass filter (LPF) and a high-pass filter (HPF). As a result of this processing, a low-frequency subband image (L, L) D105-LL and a high-frequency subband image (L, H) D105-LH of 2048×1080 size halved in the vertical direction are obtained.

In addition, the 2048×2160 high-frequency subband image (H) is subjected to a wavelet transform in the vertical direction. The wavelet transform performs 2:1 down sampling via each of a low-pass filter (LPF) and a high-pass filter (HPF). As a result of this processing, a low-frequency subband image (H, L) D105-HL and a high-frequency subband image (H, H) D105-HH of 2048×1080 size halved in the vertical direction are obtained.

As described above, the compression and decompression I/F section 105 subjects the three R/G/B components of 4096×2160 size to a wavelet transform, and obtains the following three components:

The subband image (L, L) D105-LL of 2048×1080 size passed through the low-pass filters in both the horizontal direction and the vertical direction is three R/G/B components The subband image (L, H) D105-LH of 2048×1080 size passed through the low-pass filter in the horizontal direction and the high-pass filter in the vertical direction is three R/G/B components The subband image (H, L) D105-HL of 2048×1080 size passed through the high-pass filter in the horizontal direction and the low-pass filter in the vertical direction is three R/G/B components The subband image (H, H) D105-HH of 2048×1080 size passed through the high-pass filters in both the horizontal direction and the vertical direction is three R/G/B components Thus, the four kinds of subband images of 2048×1080 size are converted into a total of 12 subband images of 2048×1080 size for three R/G/B components.

The processing of the compression and decompression I/F section 105 at the time of an inverse wavelet transform will next be described with reference to FIG. 10.

Subband images (D105-LL/HL/LH/HH) of 2048×1080 size read from the recording media section 108 and subjected to decompression processing are each input for three R/G/B components as an input image of the compression and decompression I/F section 105.

The subband image (L, L) D105-LL of 2048×1080 size passed through a low-pass filter in both the horizontal direction and the vertical direction and the subband image (L, H) D105-LH of 2048×1080 size passed through a low-pass filter in the horizontal direction and a high-pass filter in the vertical direction are subjected to an inverse wavelet transform in the vertical direction. The inverse wavelet transform subjects the subband image D105-LL to 1:2 up sampling (indicated by an upward arrow and a FIG. 2 in FIG. 10) and then passes the subband image D105-LL through a low-pass filter (LPF), and subjects the subband image D105-LH to 1:2 up sampling and then passes the subband image D105-LH through a high-pass filter (HPF). Then, both the subband images are synthesized to thereby obtain a low-frequency subband image (L) of 2048×2160 size doubled in the vertical direction.

In addition, the subband image (H, L) D105-HL of 2048×1080 size passed through a high-pass filter in the horizontal direction and a low-pass filter in the vertical direction and the subband image (H, H) D105-HH of 2048×1080 size passed through a high-pass filter in both the horizontal direction and the vertical direction are subjected to an inverse wavelet transform in the vertical direction. The inverse wavelet transform subjects the subband image D105-HL to 1:2 up sampling and then passes the subband image D105-HL through a low-pass filter (LPF), and subjects the subband image D105-HH to 1:2 up sampling and then passes the subband image D105-HH through a high-pass filter (HPF). Then, both the subband images are synthesized to thereby obtain a high-frequency subband image (H) of 2048×2160 size doubled in the vertical direction.

Next, the low-frequency subband image (L) of 2048×2160 size and the high-frequency subband image (H) of 2048×2160 size resulting from the inverse wavelet transforms in the vertical direction are subjected to an inverse wavelet transform in the horizontal direction. The inverse wavelet transform subjects the low-frequency subband image (L) to 1:2 up sampling and then passes the low-frequency subband image (L) through a low-pass filter (LPF), and subjects the high-frequency subband image (H) to 1:2 up sampling and then passes the high-frequency subband image (H) through a high-pass filter (HPF). Then, both the subband images are synthesized to thereby obtain reproduced RAW data D105 of 4096×2160 size also doubled in the horizontal direction.

As described above, the processing of the compression and decompression I/F section 105 at the time of the inverse wavelet transform is performed using the subband images (D105-LL/HL/LH/HH) of 2048×1080 size read from the recording media section 108 and subjected to decompression processing. In this processing, the inverse wavelet transform is performed in the vertical direction and the horizontal direction using the subband images for three R/G/B components, and thereby the subband images are decoded into three R/G/B components of 4096×2160 size.

How the compression and decompression I/F section 105 in the present example performs processing for the double density Bayer arrangement shown in FIG. 2 will now be described with reference to FIGS. 11A to 11D.

FIG. 11A shows the double density Bayer arrangement formed by doubling the pixel density of the normal Bayer arrangement and obliquely arranging the normal Bayer arrangement at 45°, as described above. In the double density Bayer arrangement, a G image is 4K full pixels, and an R image and a B image are obliquely spaced but provide a 4K resolution in the horizontal direction and the vertical direction.

At this time, the image pickup element section 102 has the double density Bayer arrangement as a pixel arrangement obtained by doubling the pixel density of the Bayer arrangement and obliquely arranging the Bayer arrangement at 45°.

The compression and decompression I/F section 105 resolves R and B image data of RGB image data output from the image pickup element section 102 of the double density Bayer arrangement into R and B subband images by scanning pixels with two upper and lower lines adjacent to each other as a unit and performing a wavelet transform in the horizontal direction or by scanning pixels with two left and right columns adjacent to each other as a unit and performing a wavelet transform in the vertical direction. The compression and decompression I/F section 105 resolves G image data into G subband images by performing a wavelet transform in the horizontal direction with pixels of one line as a unit and performing a wavelet transform in the vertical direction with pixels of one column as a unit.

Specifically, first making description for G, it is clear that exactly the same processing as the processing described with reference to FIG. 9 suffices because the G image has 4K full pixels.

Specifically, the compression and decompression I/F section 105 subjects the G image of 4096×2160 size to a wavelet transform in the horizontal direction as shown in FIG. 11B. Then, a low-frequency subband G image (L) and a high-frequency subband G image (H) of 2048×2160 size halved in the horizontal direction are obtained as shown in FIG. 11C. Taking a 5×3 reversible wavelet filter (five taps for a filter on a low-pass side and three taps for a filter on a high-pass side) defined in JPEG2000 as an example, an area enclosed by a dotted line in the figure represents a pixel range covered by the five-tap filter (filter on the low-pass side) with a pixel at a left end in the figure (a pixel provided with a star) as a center of the pixel range. This is performed for every two pixels in the horizontal direction, thereby realizing 2:1 down sampling. For details, reference should be made to JPEG2000 standards or the like.

Next, the low-frequency subband G image (L) and the high-frequency subband G image (H) of 2048×2160 size halved in the horizontal direction are each subjected to a wavelet transform in the vertical direction as shown in FIG. 11C. Then, the following subband images are obtained, as shown in FIG. 11D.

A subband G image (LL) of 2048×1080 size passed through a low-pass filter in both the horizontal direction and the vertical direction.

A subband G image (LH) of 2048×1080 size passed through a low-pass filter in the horizontal direction and a high-pass filter in the vertical direction.

A subband G image (HL) of 2048×1080 size passed through a high-pass filter in the horizontal direction and a low-pass filter in the vertical direction.

A subband G image (HH) of 2048×1080 size passed through a high-pass filter in both the horizontal direction and the vertical direction.

Thus, the G image forming the 4K double density Bayer RAW image is converted into four kinds of subband G images of 2048×1080 size.

Consideration will now be given to the R image and the B image. The R image and the B image are in a checkered pattern. Therefore, when the method described with reference to FIGS. 8A to 8D is used, pixel density is low and compression efficiency is decreased as well, as described above. Thus a balance with the compressed image quality of the G image is further disturbed.

The compression and decompression I/F section 105 in the present example accordingly subjects the R image and the B image to a wavelet transform with two upper and lower lines adjacent to each other as a unit.

Specifically, as shown in FIG. 11B, the compression and decompression I/F section 105 scans pixels of the R image in the form of W with two upper and lower lines adjacent to each other as a unit, and performs a wavelet transform as if the pixels formed pixel data of one line.

In addition, the compression and decompression I/F section 105 scans pixels of the B image in the form of M with two upper and lower lines adjacent to each other as a unit, and performs a wavelet transform as if the pixels formed pixel data of one line.

When two upper and lower lines are set as a unit, one line can be considered to have 4096 real pixels. Thus, the R image and the B image can be treated as a 4096×1080 image.

This 4096×1080 R image is subjected to a wavelet transform in the horizontal direction to be converted into:
a subband R image of 2048×1080 size passed through a low-pass filter; and a subband R image of 2048×1080 size passed through a high-pass filter.

The 4096×1080 B image is similarly subjected to a wavelet transform in the horizontal direction to be converted into:
a subband B image of 2048×1080 size passed through a low-pass filter; and
a subband B image of 2048×1080 size passed through a high-pass filter.

At a point in time that the wavelet transforms in the horizontal direction have been performed, subband images of 2048×1080 size are already obtained, and the size coincides with the size of the subband images of G. Thus, no wavelet transform is performed in the vertical direction.

This means that subband images of uniform 2048×1080 size are obtained for all of RGB, that 2048×1080 RGB full images are obtained, and that simple so-called color separation has been performed.

Thus, the subband images as output from the compression and decompression I/F section 105 have the same size in the 4K full pixel system and the 4K double density Bayer arrangement, so that processing from the compression and decompression processing section 106 on down can be made to be common processing. This will be described in detail separately.

In FIG. 11D, the following description is used for distinction from other systems to be described later and for description of the R image and the B image having been subjected to only a wavelet transform in the horizontal direction.

The subband R image of 2048×1080 size passed through the low-pass filter is a subband R image (LL)

The subband R image of 2048×1080 size passed through the high-pass filter is a subband R image (HL)

The subband B image of 2048×1080 size passed through the low-pass filter is a subband B image (LL)

The subband B image of 2048×1080 size passed through the high-pass filter is a subband B image (HL)

While description has been made supposing that the compression and decompression I/F section 105 scans R pixels in the form of W and scans B pixels in the form of M, it is clear that the form of W and the form of M are inverted when starting pixel positions of the R pixels and the B pixels become different.

A method for solving the problems by thus performing a wavelet transform with two upper and lower lines adjacent to each other as a unit for the R image and the B image of the double density Bayer arrangement has been described with reference to FIGS. 11A to 11D. A method for solving the problems by performing a wavelet transform with two left and right pixels adjacent to each other as a unit for the R image and the B image of the double density Bayer arrangement will be described as another method with reference to FIGS. 12A to 12D.

First, as for the G image, because the G image has 4K full pixels, exactly the same processing as the processing described with reference to FIGS. 11A to 11D is performed, and will be omitted here.

Though obvious from FIGS. 12A to 12D, processing for the R image and the B image of the double density Bayer arrangement will be described in order.

At this time, the compression and decompression I/F section 105 scans pixels of the R and B image data of RGB image data output from the image pickup element section 102 of the double density Bayer arrangement with two right and left columns adjacent to each other as a unit, and performs a wavelet transform in the vertical direction. Then, for the G image data, the compression and decompression I/F section 105 performs a wavelet transform in the horizontal direction with pixels of one line as a unit and a wavelet transform in the vertical direction with pixels of one column as a unit.

Specifically, as shown in FIG. 12B, R pixels and B pixels are sent to a wavelet transform in the vertical direction as they are without being subjected to a wavelet transform in the horizontal direction. At this time, as shown in FIG. 12C, the compression and decompression I/F section 105 scans the R pixels in the form of a leftward facing W with two left and right pixels adjacent to each other as a unit, and performs a wavelet transform as if the pixels formed pixel data arranged in one column.

In addition, the compression and decompression I/F section 105 scans the B pixels in the form of a rightward facing W with two left and right pixels adjacent to each other as a unit, and performs a wavelet transform as if the pixels formed pixel data arranged in one column.

When two left and right pixels are set as a unit, the R image and the B image can be considered to have 2160 real pixels in, the vertical direction. Thus, the R image and the B image can be treated as a 2048×2160 image.

This 2048×2160 R image is subjected to a wavelet transform in the vertical direction. At this time, the compression and decompression I/F section 105 converts the 2048×2160 R image, into:

a subband R image of 2048×1080 size passed through a low-pass filter; and a subband R image of 2048×1080 size passed through a high-pass filter.

The 2048×2160 B image is similarly subjected to a wavelet transform in the vertical direction. At this time, the compression and decompression I/F section 105 converts the 2048×2160 B image into:

a subband B image of 2048×1080 size passed through a low-pass filter; and a subband B image of 2048×1080 size passed through a high-pass filter.

At a point in time that the wavelet transforms in the vertical direction have been performed, subband images of 2048×1080 size are obtained, and the size coincides with the size of the subband images of G.

Thus, the subband images as output from the compression and decompression I/F section 105 have the same size in the 4K full pixel system and the 4K double density Bayer arrangement, so that processing from the compression and decompression processing section 106 on down can be made to be common processing. This will be described in detail separately.

In FIG. 12D, the subband images are described as follows for distinction from other systems to be described later and for description of the R image and the B image having been subjected to only a wavelet transform in the vertical direction.

The subband R image of 2048×1080 size passed through the low-pass filter is a subband R image (LL)

The subband R image of 2048×1080 size passed through the high-pass filter is a subband R image (LH)

The subband B image of 2048×1080 size passed through the low-pass filter is a subband B image (LL)

The subband B image of 2048×1080 size passed through the high-pass filter is a subband B image (LH)

While description has been made above with reference to FIGS. 12A to 12D supposing that the compression and decompression I/F section 105 scans R pixels in the form of a leftward facing W and scans B pixels in the form of a rightward facing W, it is clear that the form of the leftward facing W and the form of the rightward facing W are reversed when starting pixel positions of the R pixels and the B pixels become different.

How wavelet transform processing is performed for the double density Bayer arrangement has been described above with reference to FIGS. 11A to 11D and FIGS. 12A to 12D.

The pixel barycentric positions of subband images of 2048×1080 size passed through a low-pass filter after a wavelet transform will next be described with reference to FIGS. 13A to 13D.

Description in the following will be made using (−1/8, 2/8, 6/8, 2/8, −1/8) as JPEG2000 5×3 reversible wavelet filter coefficients as an example.

FIG. 13A shows an example in which a 5×3 reversible wavelet filter is applied to a G image. First, five pixels in the horizontal direction are multiplied by the filter coefficients of (−1/8, 2/8, 6/8, 2/8, −1/8). The third pixel is multiplied by 6/8, and the two left pixels and the two right pixels with the third pixel as a center are multiplied by the symmetric coefficients. Thus, the barycenter of the pixels in the horizontal direction coincides with the position of the third pixel.

Next, five pixels in the vertical direction are multiplied by the filter coefficients of (−1/8, 2/8, 6/8, 2/8, −1/8). The third pixel is multiplied by 6/8, and the two upper pixels and the two lower pixels with the third pixel as a center are multiplied by the symmetric coefficients. Thus, the barycenter of the pixels in the vertical direction also coincides with the position of the third pixel.

That is, the pixel barycentric position of the subband image of 2048×1080 size obtained by passing the G image through a low-pass wavelet filter is the position of the pixel (circle mark ○ in FIG. 13A) multiplied by the filter coefficient of 6/8 in both the horizontal direction and the vertical direction.

FIG. 13B shows an example in which a 5×3 reversible wavelet filter is applied to an R image. As described with reference to FIGS. 11A to 11D, the compression and decompression I/F section 105 scans pixels of the R image in the form of W with two upper and lower lines adjacent to each other as a unit, and subjects the pixels to a wavelet transform as if the pixels were pixel data of one line.

The five pixels are multiplied by the filter coefficients of (−1/8, 2/8, 6/8, 2/8, −1/8). The third pixel is multiplied by 6/8, and the two left pixels and the two right pixels with the third pixel as a center are multiplied by the symmetric coefficients. Thus, the barycenter of the pixels in the horizontal direction coincides with the position of the third pixel.

The R image is not subjected to a wavelet transform in the vertical direction. Directing attention to the above wavelet coefficients in the horizontal direction, the filter coefficients of (−1/8, 6/8, −1/8) are applied to the three pixels on the upper line. It is thus shown that the weight of the coefficients for the three pixels on the upper line is

−1/8+6/8−1/8=1/2

Next, the filter coefficients of (2/8, 2/8) are applied to the two pixels on the lower line, and it is thus shown that the weight of the coefficients for the two pixels on the lower line is

2/8+2/8=1/2

It is shown from the above that the barycenter of the pixels in the vertical direction of the R image is exactly a middle position between the two lines where the pixels are scanned in the form of W with the two upper and lower lines adjacent to each other as a unit.

That is, the pixel barycentric position of the subband image of 2048×1080 size obtained by passing the R image through a low-pass wavelet filter is the position of the pixel multiplied by the filter coefficient of 6/8 in the horizontal direction and the position between the lines set as the two upper and lower lines adjacent to each other as a unit in the vertical direction (circle mark ○ in FIG. 13B).

FIG. 13C shows an example in which a 5×3 reversible wavelet filter is applied to a B image. As described with reference to FIGS. 11A to 11D, the compression and decompression I/F section 105 scans pixels of the B image in the form of M with two upper and lower lines adjacent to each other as a unit, and subjects the pixels to a wavelet transform as if the pixels were pixel data of one line.

The five pixels are multiplied by the filter coefficients of (−1/8, 2/8, 6/8, 2/8, −1/8). The third pixel is multiplied by 6/8, and the two left pixels and the two right pixels with the third pixel as a center are multiplied by the symmetric coefficients. Thus, the barycenter of the pixels in the horizontal direction coincides with the position of the third pixel.

The B image is not subjected to a wavelet transform in the vertical direction. Directing attention to the above wavelet coefficients in the horizontal direction, the filter coefficients of (−1/8, 6/8, −1/8) are applied to the three pixels on the lower line. It is thus shown that the weight of the coefficients for the three pixels on the lower line is

−1/8+6/8−1/8=1/2

Next, the filter coefficients of (2/8, 2/8) are applied to the two pixels on the upper line, and it is thus shown that the weight of the coefficients for the two pixels on the upper line is

2/8+2/8=1/2

It is shown from the above that the barycenter of the pixels in the vertical direction of the B image is exactly a middle position between the two lines where the pixels are scanned in the form of M with the two upper and lower lines adjacent to each other as a unit.

That is, the pixel barycentric position of the subband image of 2048×1080 size obtained by passing the B image through a low-pass wavelet filter is the position of the pixel multiplied by the filter coefficient of 6/8 in the horizontal direction and the position between the lines set as the two upper and lower lines adjacent to each other as a unit in the vertical direction (circle mark ○ in FIG. 13C).

Summarizing the above, the pixel barycentric positions of the subband images of 2048×1080 size passed through the low-pass wavelet filters are as shown in FIG. 13D. At this time, it is shown that the R image and the B image have the same position, whereas the G image has the same position in the vertical direction and is only slightly shifted by a 1/2 of a pixel.

One of the features of subband division using a wavelet filter such as JPEG2000 and the like is that image sizes of $1/2^n$ resolution can be obtained from one compressed stream. This shows that also in the double density Bayer arrangement, the pixel barycentric positions of RGB are substantially the same when only a low-frequency subband image of half an image size in each of the horizontal direction and the vertical direction is displayed. That is, it is shown that a low-frequency subband image substantially free from a color shift can be displayed without the pixel barycentric positions being made to coincide with each other.

Of course, the pixel barycentric positions of RGB perfectly coincide with each other when the G image is corrected by 1/2 of a pixel in the horizontal direction. Also in this case, because only the G image is corrected by 1/2 of a pixel only in the horizontal direction, an effect is obtained in that a small hardware scale suffices.

In addition, when the R image and the B image are subjected to a wavelet transform only in the vertical direction as shown in FIGS. 12A to 12D, it is shown that when similar consideration to that of FIGS. 13A to 13D is applied, though not shown in detail, the R image and the B image have the same position, whereas the G image has the same position in the horizontal direction and is only slightly shifted by 1/2 of a pixel in the vertical direction.

The above is details of processing for the double density Bayer arrangement.

An example of compression coding processing for the oblique arrangement three-panel system in FIG. 2 will next be described with reference to FIGS. 14A to 14D.

Figure 14A:
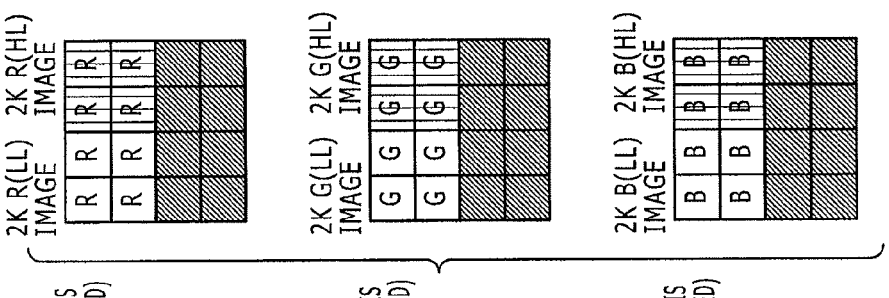
FIGS. 14A, 14B, 14C, and 14D are diagrams of wavelet transform processing of the compression and decompression I/F section for an oblique arrangement three-panel system.

FIG. 14A shows a pixel arrangement having pixels arranged obliquely at 45° as one image pickup element 102 and assuming that pixel interpolation is performed between two horizontal or vertical pixels or four horizontal or vertical pixels adjacent to each other to interpolate pixels indicated by dotted line circle marks in the figure.

At this time, the image pickup element section 102 is the oblique arrangement three-panel system as a pixel arrangement having pixels arranged obliquely at 45° and assuming that interpolation is performed between pixels adjacent to each other in the horizontal direction or the vertical direction.

Description in the following will be made of a method for applying the present invention to a system performing image pickup using three image pickup elements 102 having the above-described pixel arrangement in combination with an optical prism or a single-panel type image pickup system having the pixel arrangement and having such a structure as to have light wavelength sensitivity in a direction of depth of a sensor.

Figure 14B:
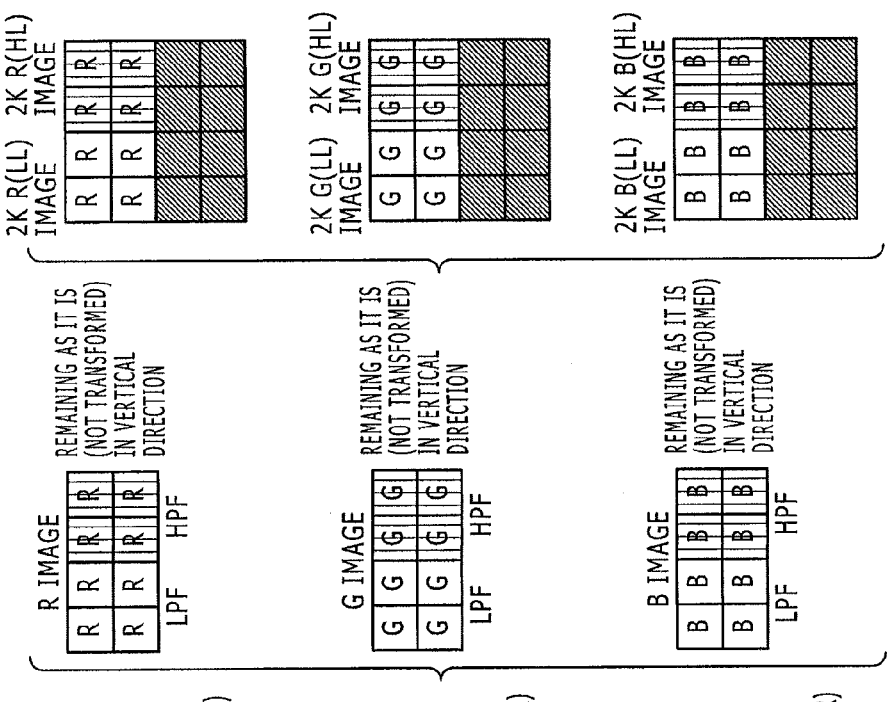
Figure 14C:
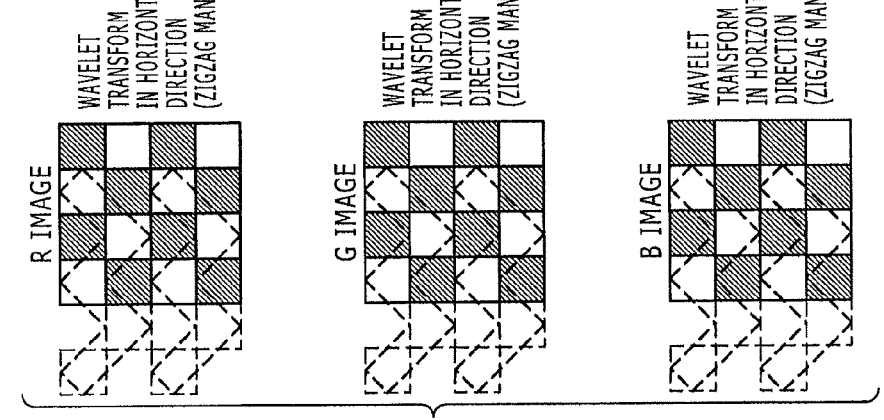

First, because it is assumed that the pixels indicated by the dotted line circle marks in FIG. 14A are interpolated from surrounding pixels, the pixels indicated by the dotted line circle marks in FIG. 14A can be considered to be nonexistent as real pixels. That is, as shown in FIG. 14B, the pixels indicated by hatching are considered to be nonexistent, and this pattern can therefore be considered to be the same as that of R or B pixels in the double density Bayer arrangement described above with reference to FIGS. 11A to 11D.

A difference lies in that an R image, a B image, and a G image all have the same pattern.

It therefore suffices to subject the R image, the B image, and the G image to a wavelet transform with two upper and lower lines adjacent to each other as a unit.

At this time, the compression and decompression I/F section 105 scans pixels of all of RGB image data from the image pickup element section 102 of the oblique arrangement three-panel system with two upper and lower lines adjacent to each other as a unit and performs a wavelet transform in the horizontal direction, or scans pixels of all of the RGB image data from the image pickup element section 102 of the oblique arrangement three-panel system with two left and right columns adjacent to each other as a unit and performs a wavelet transform in the vertical direction.

Specifically, as shown in FIG. 14B, the compression and decompression I/F section 105 scans pixels in the form of W with two upper and lower lines adjacent to each other as a unit, and performs a wavelet transform as if the pixels were pixel data of one line. Depending on the starting position of the pixels, it is possible to scan the pixels in the form of M with the two upper and lower lines adjacent to each other as a unit, and perform a wavelet transform as if the pixels were pixel data of one line.

When two upper and lower lines are set as a unit, one line can be considered to have 4096 real pixels. Thus, the RGB images can be treated as a 4096×1080 image.

The 4096×1080 images are subjected to a wavelet transform in the horizontal direction, whereby the RGB images are each converted into:

a subband image of 2048×1080 size passed through a low-pass filter; and a subband image of 2048×1080 size passed through a high-pass filter.

At a point in time that the wavelet transforms in the horizontal direction have been performed, subband images of 2048×1080 size are already obtained. Thus, no wavelet transform is performed in the vertical direction.

This means that subband images of uniform 2048×1080 size are obtained for all of RGB, that 2048×1080 RGB full images are obtained, and that simple so-called color separation has been performed.

Thus, the subband images as output from the compression and decompression I/F section 105 have the same size in the 4K full pixel system and the 4K oblique arrangement three-panel system, so that processing from the compression and decompression processing section 106 on down can be made to be common processing. This will be described in detail separately.

Figure 14D:
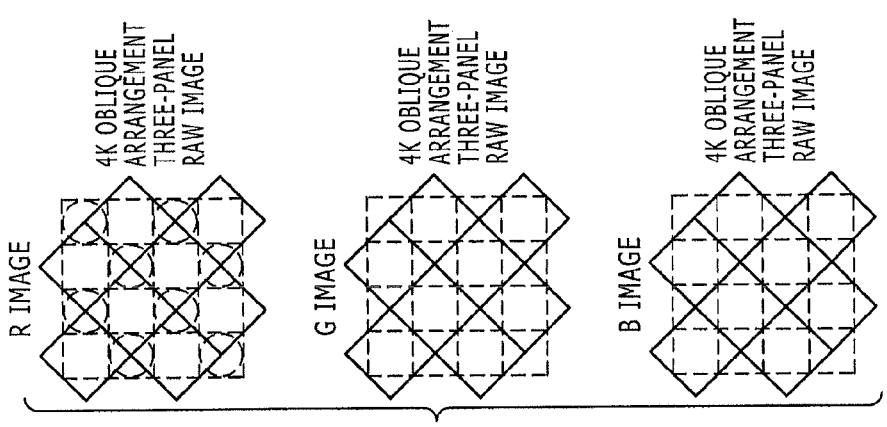

In FIG. 14D, the subband images of 2048×1080 size are described as follows for distinction from other systems to be described later and for description of the images having been subjected to only a wavelet transform in the horizontal direction.

The subband R image of 2048×1080 size passed through the low-pass filter is a subband R image (LL)

The subband R image of 2048×1080 size passed through the high-pass filter is a subband R image (HL)

The subband G image of 2048×1080 size passed through the low-pass filter is a subband G image (LL)

The subband G image of 2048×1080 size passed through the high-pass filter is a subband G image (HL)

The subband B image of 2048×1080 size passed through the low-pass filter is a subband B image (LL)

The subband B image of 2048×1080 size passed through the high-pass filter is a subband B image (HL)

While description has been made with reference to FIGS. 14A to 14D of processing in which the images of the oblique arrangement three-panel system are subjected to a wavelet transform with two upper and lower lines adjacent to each other as a unit, it is also possible as another method to perform a wavelet transform with two left and right pixels adjacent to each other as a unit. However, the processing is exactly the same as processing described as the processing of the R image and the B image of the double density Bayer arrangement as described with reference to FIGS. 12A to 12D, and will be omitted here.

The pixel barycentric positions of subband images of 2048×1080 size passed through a low-pass filter after a wavelet transform in the double density Bayer arrangement have been described with reference to FIGS. 13A to 13D.

However, in the oblique arrangement three-panel system, pixel positions are adjusted so as to coincide optically with each other. It is thus obvious that the pixel barycentric positions of subband images of 2048×1080 size passed through the low-pass filters after the wavelet transform for RGB are the same, and therefore description thereof will be omitted.

The above is details of processing for the oblique arrangement three-panel system.

An example of processing for the normal Bayer arrangement shown in FIG. 2 will next be described with reference to FIGS. 15A to 15D.

FIG. 15A shows a so-called normal Bayer arrangement.

At this time, the image pickup element section 102 has the Bayer arrangement.

In FIG. 15B, the Bayer arrangement is separated into each of RGB, and positions where no real pixel is present are indicated by hatching. The R image and the B image are already discretely reduced images of 2048×1080 size in the separated state.

As is clear from FIG. 15B, the G image can be considered to be the same as the R pixels or the B pixels of the double density Bayer arrangement as described with reference to FIGS. 11A to 11D.

It therefore suffices to subject the G image to a wavelet transform with two upper and lower lines adjacent to each other as a unit.

At this time, the compression and decompression I/F section 105 does not apply a wavelet transform to R and B image data of RGB image data from the image pickup element section 102 of the Bayer arrangement. Then, the compression and decompression I/F section 105 scans pixels of the G image data with two upper and lower lines adjacent to each other as a unit and performs a wavelet transform in the horizontal direction, or scans pixels of the G image data with two left and right columns adjacent to each other as a unit and performs a wavelet transform in the vertical direction.

Specifically, as shown in FIG. 15B, the compression and decompression I/F section 105 scans pixels in the form of M with two upper and lower lines adjacent to each other as a unit, and performs a wavelet transform as if the pixels were pixel data of one line.

Depending on the starting position of the pixels, it is possible to scan the pixels in the form of W with the two upper and lower lines adjacent to each other as a unit, and perform a wavelet transform as if the pixels were pixel data of one line.

When two upper and lower lines are set as a unit, one line can be considered to have 4096 real pixels. Thus, the G image can be treated as a 4096×1080 image.

The 4096×1080 G image is subjected to a wavelet transform in the horizontal direction to be converted into:

a subband G image of 2048×1080 size passed through a low-pass filter; and a subband G image of 2048×1080 size passed through a high-pass filter.

At a point in time that the wavelet transforms in the horizontal direction have been performed, subband images of 2048×1080 size are already obtained. Thus, no wavelet transform is performed in the vertical direction.

This means that subband images of uniform 2048×1080 size are obtained for all of RGB though the R image and the B image are discretely reduced, that 2048×1080 RGB full images are obtained, and that simple so-called color separation has been performed.

Thus, the subband images as output from the compression and decompression I/F section 105 have the same size in the 4K full pixel system and the 4K normal Bayer arrangement, so that processing from the compression and decompression processing section 106 on down can be made to be common processing. This will be described in detail separately.

In FIG. 15D, description is made as follows to make the R image and the B image common for the processing of other systems, though the R image and the B image are discretely reduced, and, in relation to the G image, for distinction from the other systems to be described later and for description of the image having been subjected to only a wavelet transform in the horizontal direction.

The R image of 2048×1080 size is a subband R image (LL)

The subband G image of 2048×1080 size passed through the low-pass filter is a subband G image (LL)

The subband G image of 2048×1080 size passed through the high-pass filter is a subband G image (HL)

The B image of 2048×1080 size is a subband B image (LL)

While description has been made with reference to FIGS. 15A to 15D of a method in which the G image of the normal Bayer arrangement is subjected to a wavelet transform with two upper and lower lines adjacent to each other as a unit, it is also possible as another method to perform a wavelet transform with two left and right pixels adjacent to each other as a unit. However, the method is exactly the same as processing described as the processing of the R image and the B image of the double density Bayer arrangement as described with reference to FIGS. 12A to 12D, and will be omitted here.

The pixel barycentric positions of subband images of 2048×1080 size passed through a low-pass filter after a wavelet transform in the double density Bayer arrangement have been described with reference to FIGS. 13A to 13D. However, in the normal Bayer arrangement, the R image and the B image are subjected to simple discrete reduction processing as in other inventions. Thus, pixel positions remain those of the Bayer arrangement as they are, and therefore description thereof will be omitted.

The above is details of processing for the normal Bayer arrangement.

Description has been made to show that the compression and decompression I/F section 105 is thus compatible with any of image pickup elements of various pixel arrangements as shown in FIG. 2.

Description will next be made to show that processing from the compression and decompression processing section 106 on down can be made to be common processing because subband images as output from the compression and decompression I/F section 105 have 2048×1080 size with any of image pickup element sections 102 of various pixel arrangements as shown in FIG. 2.

Figure 16:
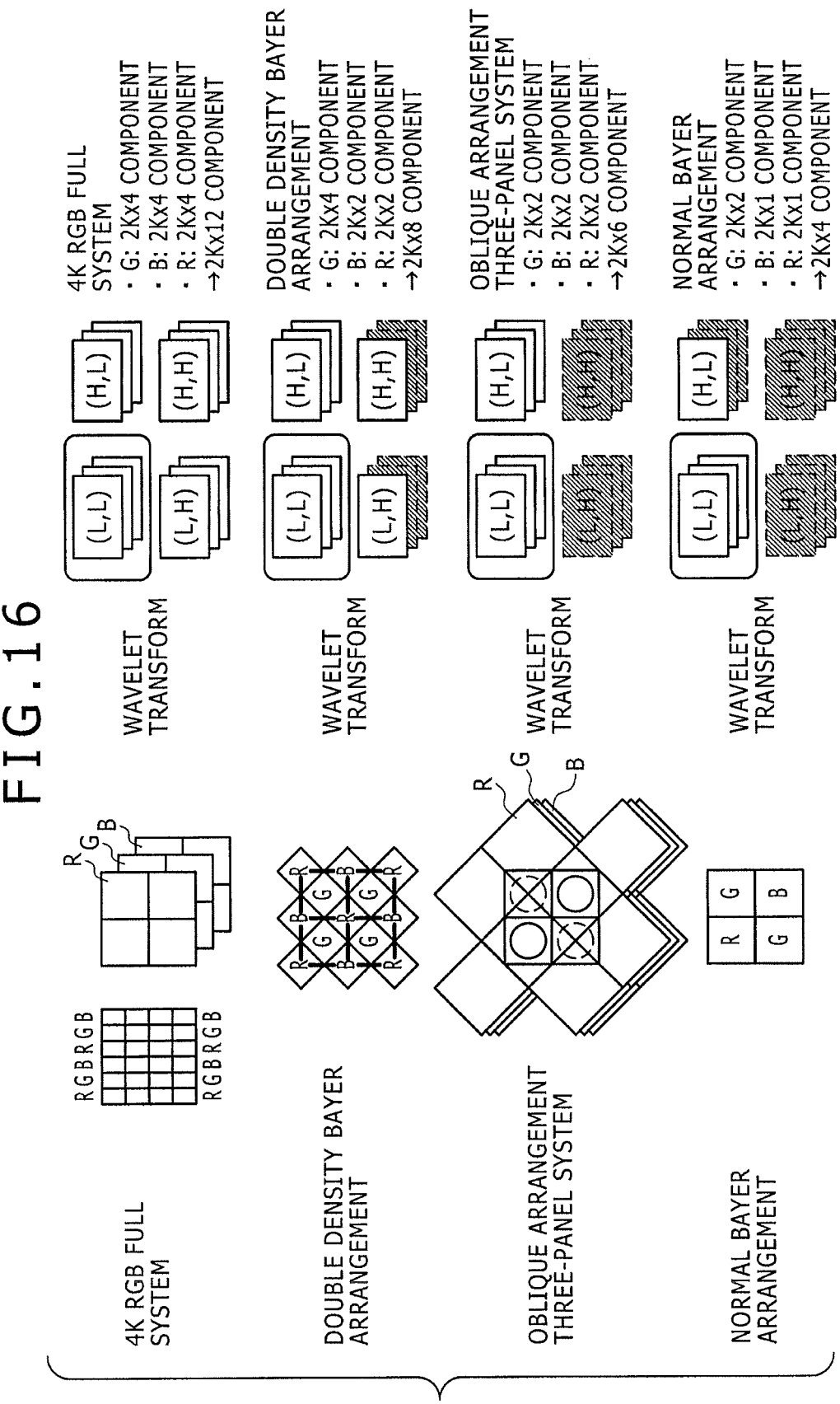
FIG. 16 is a diagram showing outputs of the compression and decompression I/F section for various kinds of pixel arrangements.

FIG. 16 shows a summary of subband images as output from the compression and decompression I/F section 105 in correspondence with the image pickup element sections 102 of the various pixel arrangements described thus far.

Specifically, the subband images can be summarized as differences in the number of subbands of 2048×1080 size as follows. (In FIG. 16, subband images not output are represented by a broken line.)

RGB Full Pixel System
G: four subband components (LL/HL/LH/HH) of 2048× 1080 size
B: four subband components (LL/HL/LH/HH) of 2048× 1080 size
R: four subband components (LL/HL/LH/HH) of 2048× 1080 size→twelve subband components of 2048×1080 size Double Density Bayer Arrangement
G: four subband components (LL/HL/LH/HH) of 2048× 1080 size
B: two subband components (LL/HL) of 2048×1080 size
R: two subband components (LL/HL) of 2048×1080 size→eight subband components of 2048×1080 size Oblique Arrangement Three-Panel System
G: two subband components (LL/HL) of 2048×1080 size
B: two subband components (LL/HL) of 2048×1080 size
R: two subband components (LL/HL) of 2048×1080 size→six subband components of 2048×1080 size Bayer Arrangement
G: two subband components (LL/HL) of 2048×1080 size
B: one subband component (LL) of 2048×1080 size
R: one subband component (LL) of 2048×1080 size→ four subband components of 2048×1080 size In addition, in any of the pixel arrangements, a subband (LL) (subbands enclosed by a thick frame in FIG. 16) is present for each of RGB images. Thus, as described above, simple color separation is made, and the subbands can be recognized as an image.

Description will next be made of concrete processing methods of the compression and decompression I/F section 105 for the image pickup elements of the various pixel arrangements.

Figure 17:
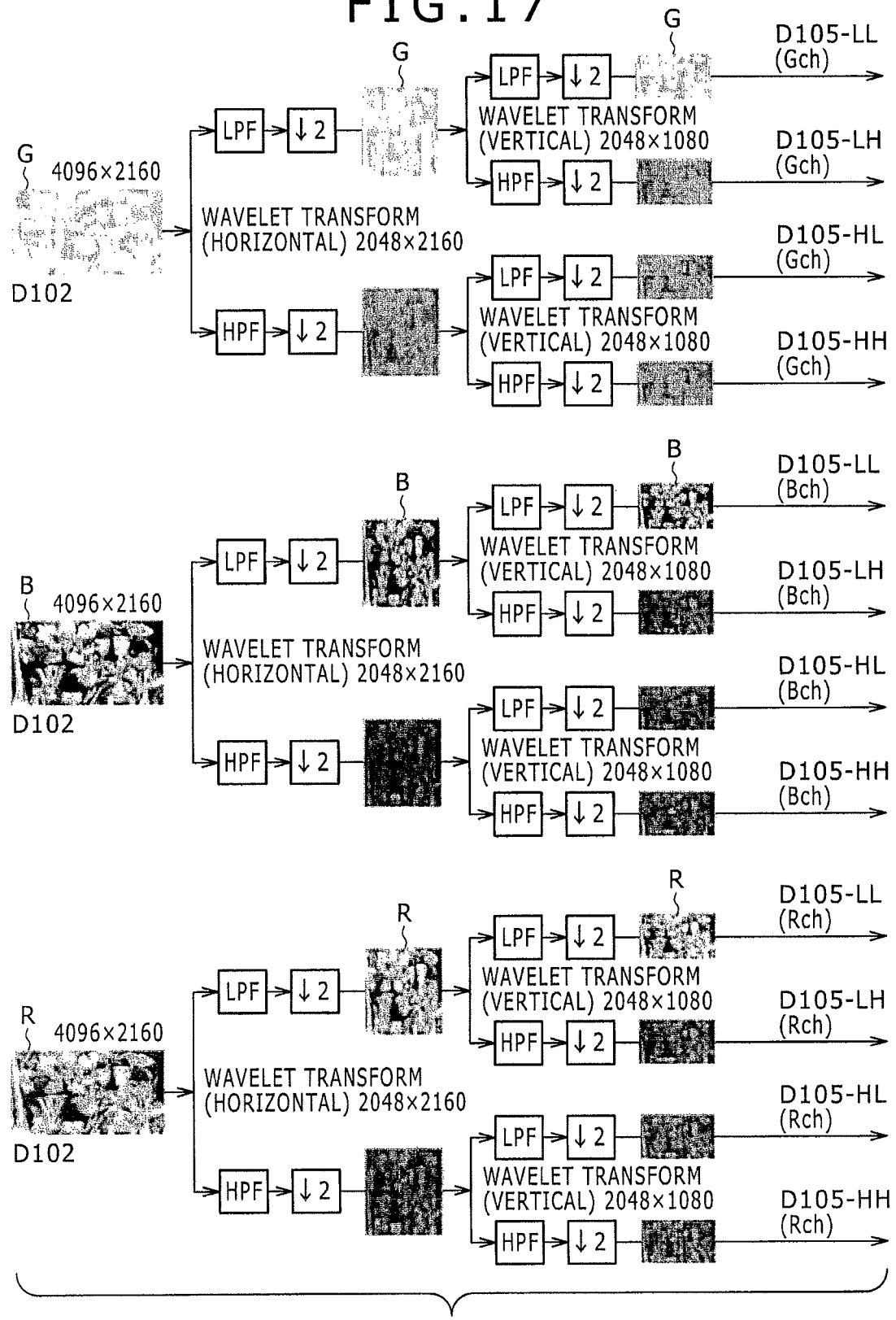
FIG. 17 is a diagram of concrete processing at a time of a wavelet transform of the compression and decompression I/F section for an RGB full pixel system.
Figure 18:
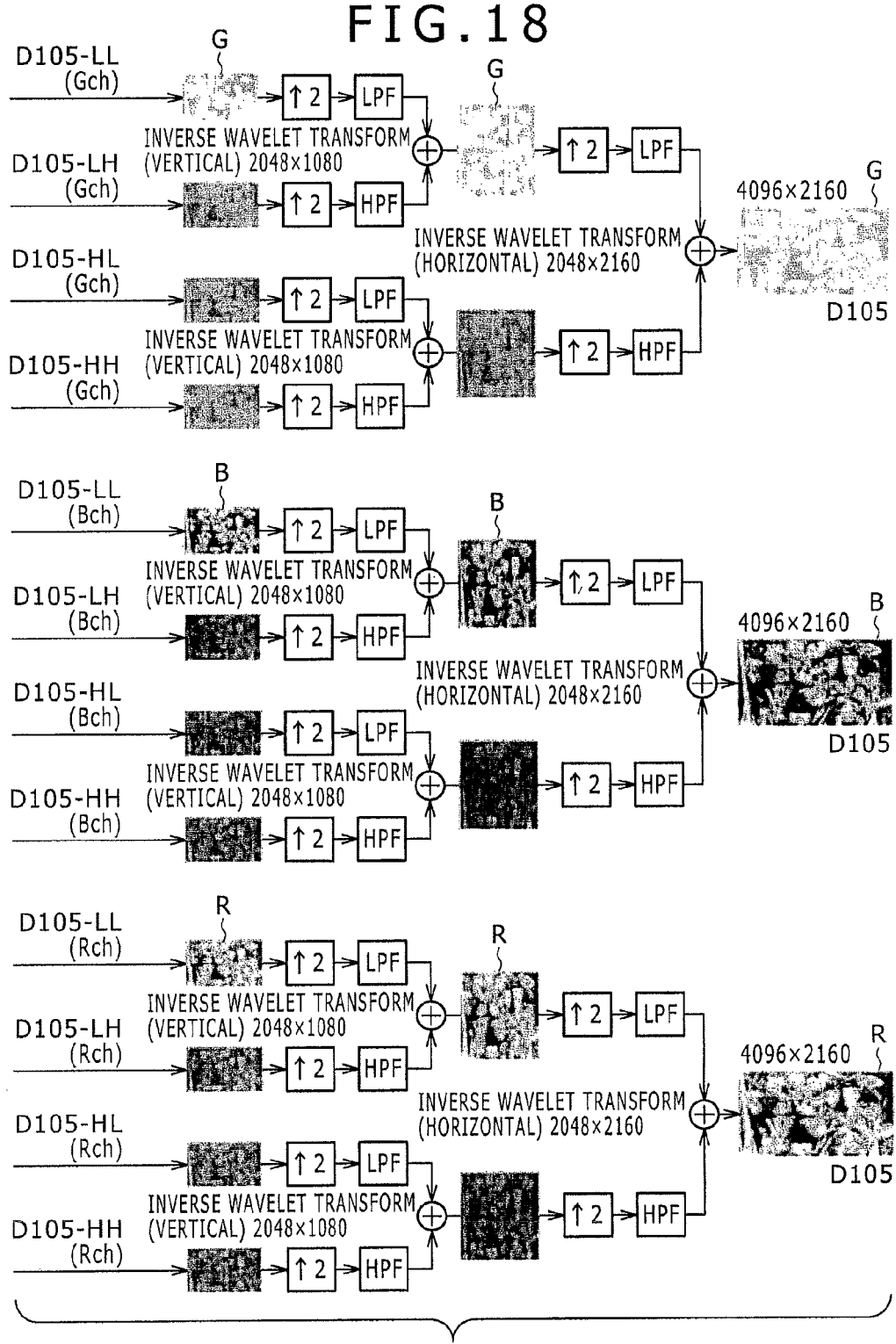
FIG. 18 is a diagram of concrete processing at a time of an inverse transform of the compression and decompression I/F section for the RGB full pixel system.

FIG. 17 and FIG. 18 are diagrams of assistance in explaining a processing method corresponding to the RGB full pixel system (FIG. 17 corresponds to processing at a time of a wavelet transform, and FIG. 18 corresponds to processing at a time of an inverse transform).

Figure 10:
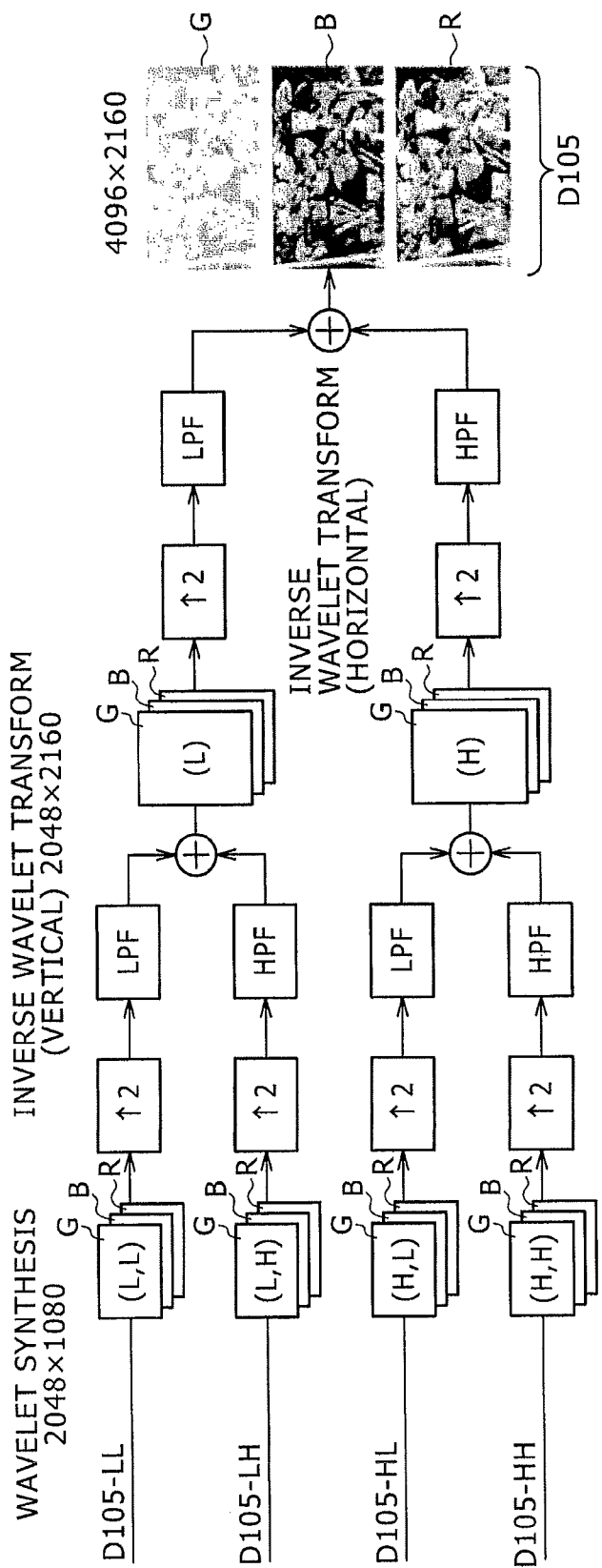
FIG. 10 is a diagram of processing of the compression and decompression I/F section at a time of an inverse transform.

FIG. 17 and FIG. 18 are the same as FIG. 9 and FIG. 10, and therefore repeated description will be omitted here. As shown in FIG. 17, the compression and decompression I/F section 105 performs same processing on all of an R image, a G image, and a B image of recording RAW data of the RGB full pixel system. At this time, the compression and decompression I/F section 105 performs a wavelet transform in both the horizontal direction and the vertical direction of the R image, the G image, and the B image, and outputs 12 components of subbands of 2048×1080 size. In addition, as shown in FIG. 18, the compression and decompression I/F section 105 performs the inverse transform of the wavelet transform, and restores the 12 components to reproduced RAW data of the RGB full pixel system.

Figure 19:
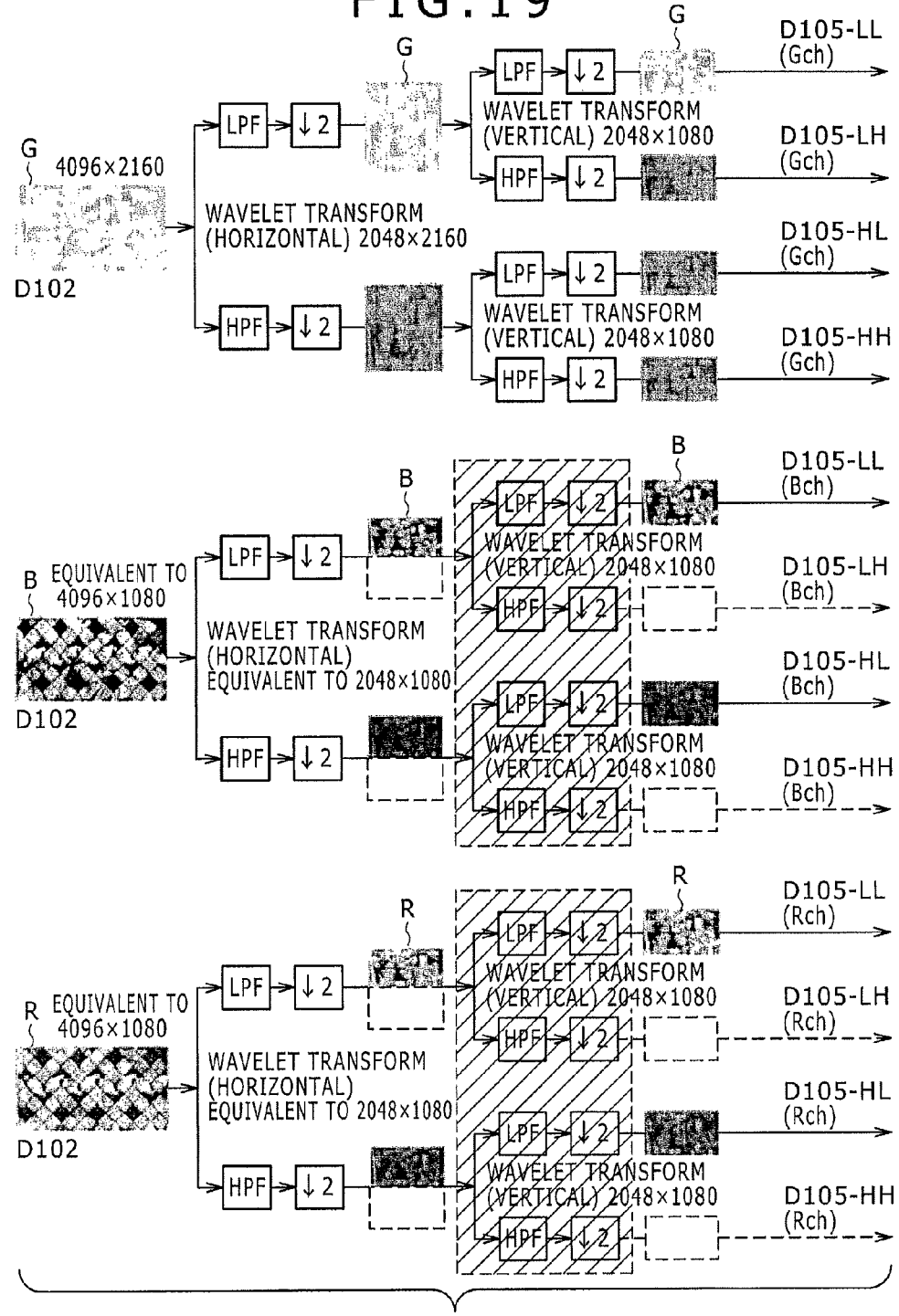
FIG. 19 is a diagram of concrete processing at a time of a wavelet transform of the compression and decompression I/F section for the double density Bayer arrangement.
Figure 20:
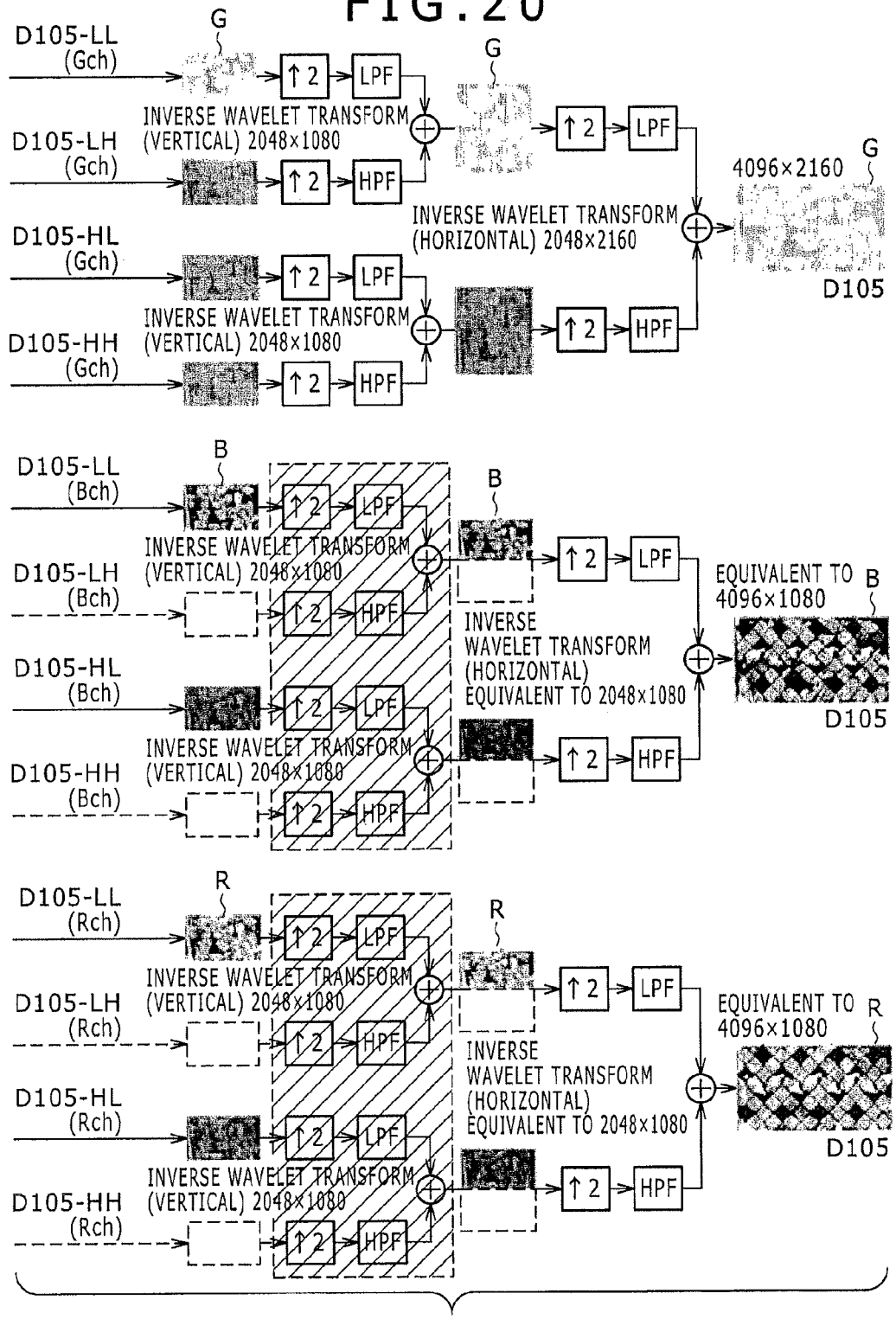
FIG. 20 is a diagram of concrete processing at a time of an inverse transform of the compression and decompression I/F section for the double density Bayer arrangement.

FIG. 19 and FIG. 20 are diagrams of assistance in explaining a processing method corresponding to an image pickup element of the double density Bayer arrangement (FIG. 19 corresponds to processing at a time of a wavelet transform, and FIG. 20 corresponds to processing at a time of an inverse transform).

As shown in FIG. 19, the compression and decompression I/F section 105 performs a wavelet transform in both the horizontal direction and the vertical direction of a G image in recording RAW data of the double density Bayer arrangement. However, for an R image and a B image, the compression and decompression I/F section 105 performs only a wavelet transform in the horizontal direction after scanning as shown in FIG. 11B, bypasses vertical direction wavelet transform circuits, and outputs the results as they are. In FIG. 19, the bypassed parts are indicated by hatching. Bypassed parts are similarly represented also in FIGS. 20 to 24 in the following. The compression and decompression I/F section 105 outputs eight components of subbands of 2048× 1080 size. As shown in FIG. 20, also in the inverse transform, for the R image and the B image, the compression and decompression I/F section 105 bypasses vertical direction wavelet synthesis circuits, and performs only a wavelet synthesis in the horizontal direction. The compression and decompression I/F section 105 can restore the G image to reproduced RAW data of the double density Bayer arrangement by performing a wavelet synthesis in both the horizontal direction and the vertical direction.

Figure 21:
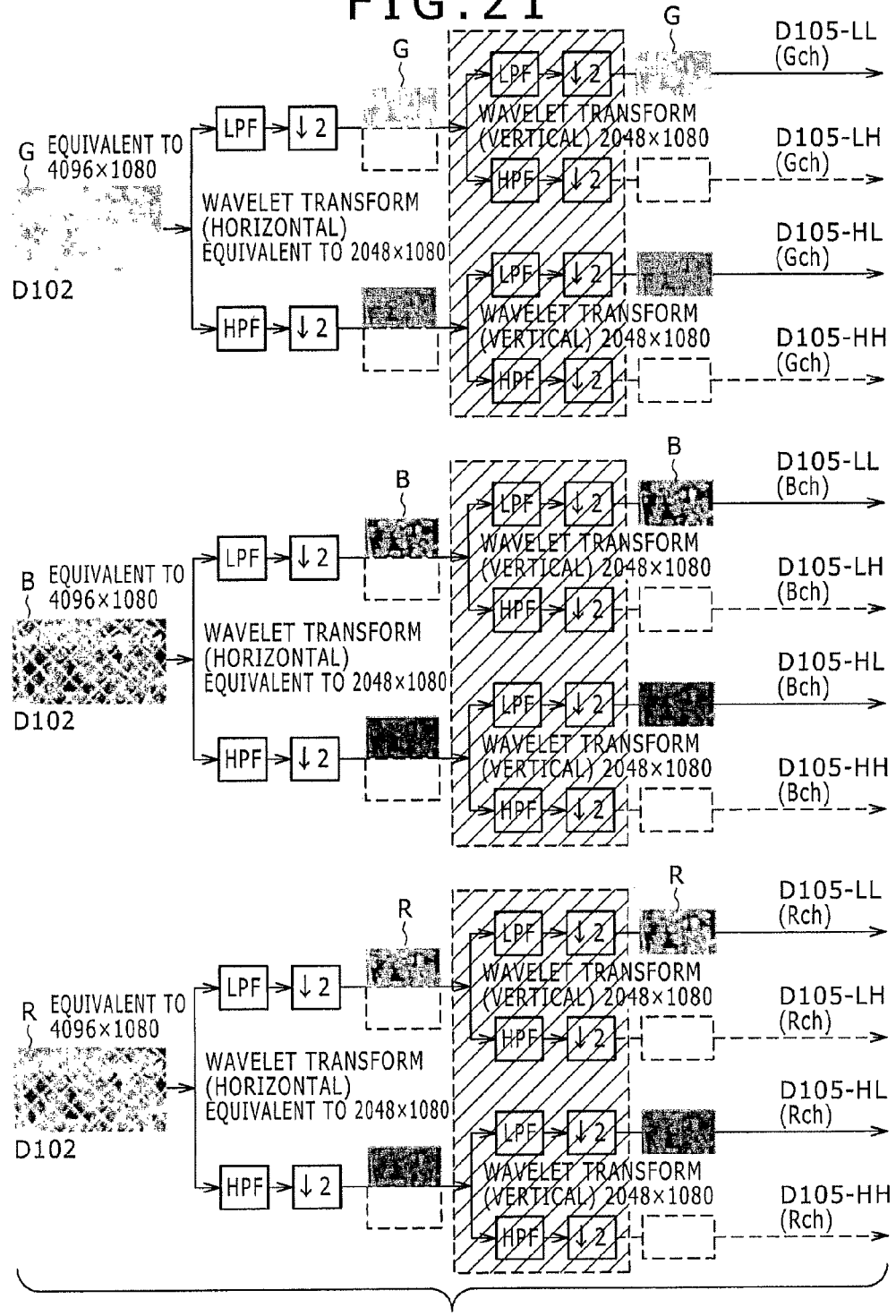
FIG. 21 is a diagram of concrete processing at a time of a wavelet transform of the compression and decompression I/F section for the oblique arrangement three-panel system.
Figure 22:
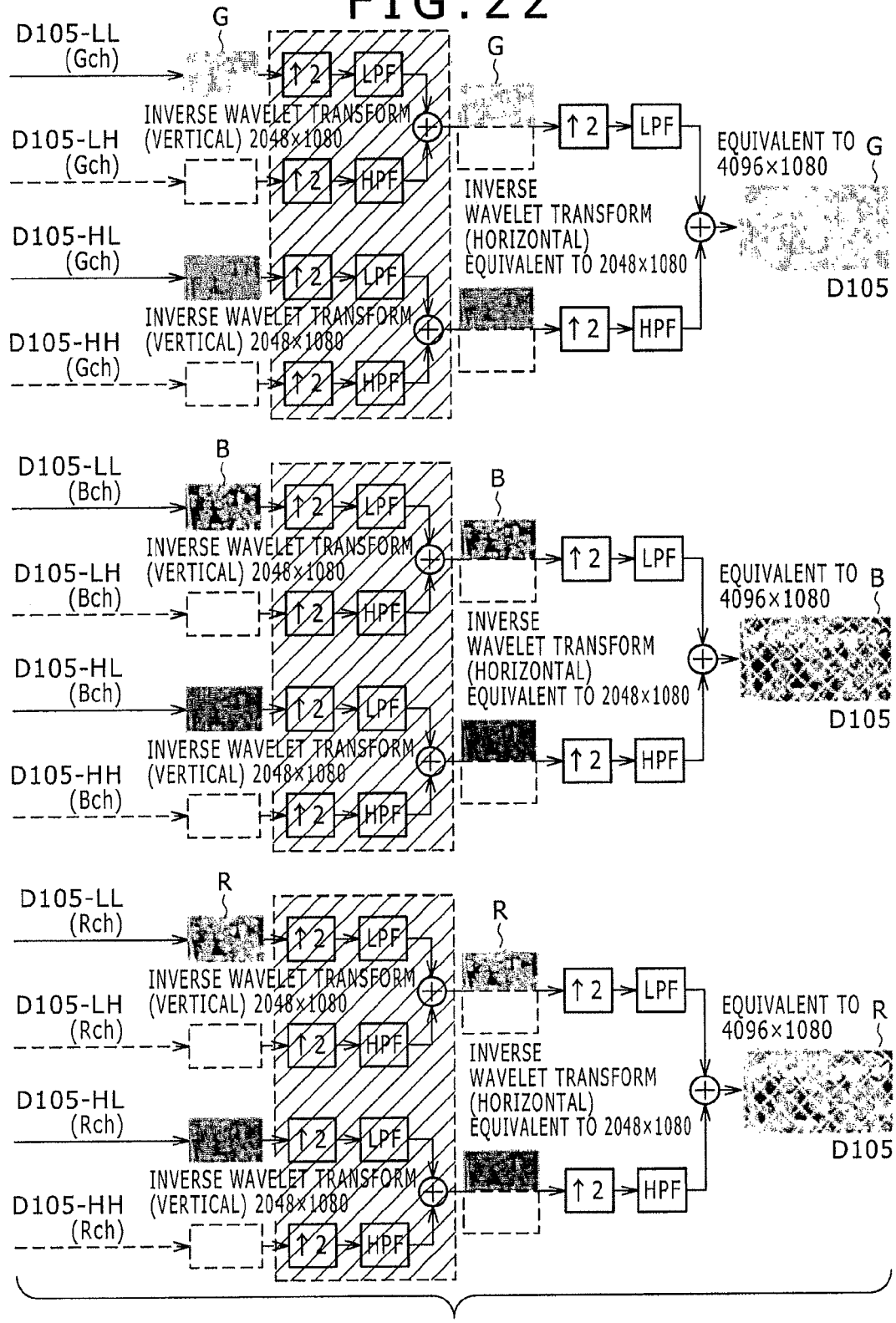
FIG. 22 is a diagram of concrete processing at a time of an inverse transform of the compression and decompression I/F section for the oblique arrangement three-panel system.

FIG. 21 and FIG. 22 are diagrams of assistance in explaining a processing method corresponding to the oblique arrangement three-panel system (FIG. 21 corresponds to processing at a time of a wavelet transform, and FIG. 22 corresponds to processing at a time of an inverse transform).

As shown in FIG. 21, the compression and decompression I/F section 105 performs same processing on all of an R image, a G image, and a B image in recording RAW data of the oblique arrangement three-panel system. At this time, the compression and decompression I/F section 105 performs scanning as shown in FIG. 14B, performs only a wavelet transform in the horizontal direction of the R image, the G image, and the B image, bypasses the vertical direction wavelet transform circuits, and outputs the results as they are. The compression and decompression I/F section 105 outputs six components of subbands of 2048×1080 size. In addition, as shown in FIG. 22, also in the inverse transform, the compression and decompression I/F section 105 performs same processing on all of the R image, the G image, and the B image. The compression and decompression I/F section 105 bypasses the vertical direction wavelet synthesis circuits, and performs only a wavelet synthesis in the horizontal direction. The compression and decompression I/F section 105 restores the six components to reproduced RAW data of the oblique arrangement three-panel system.

Figure 23:
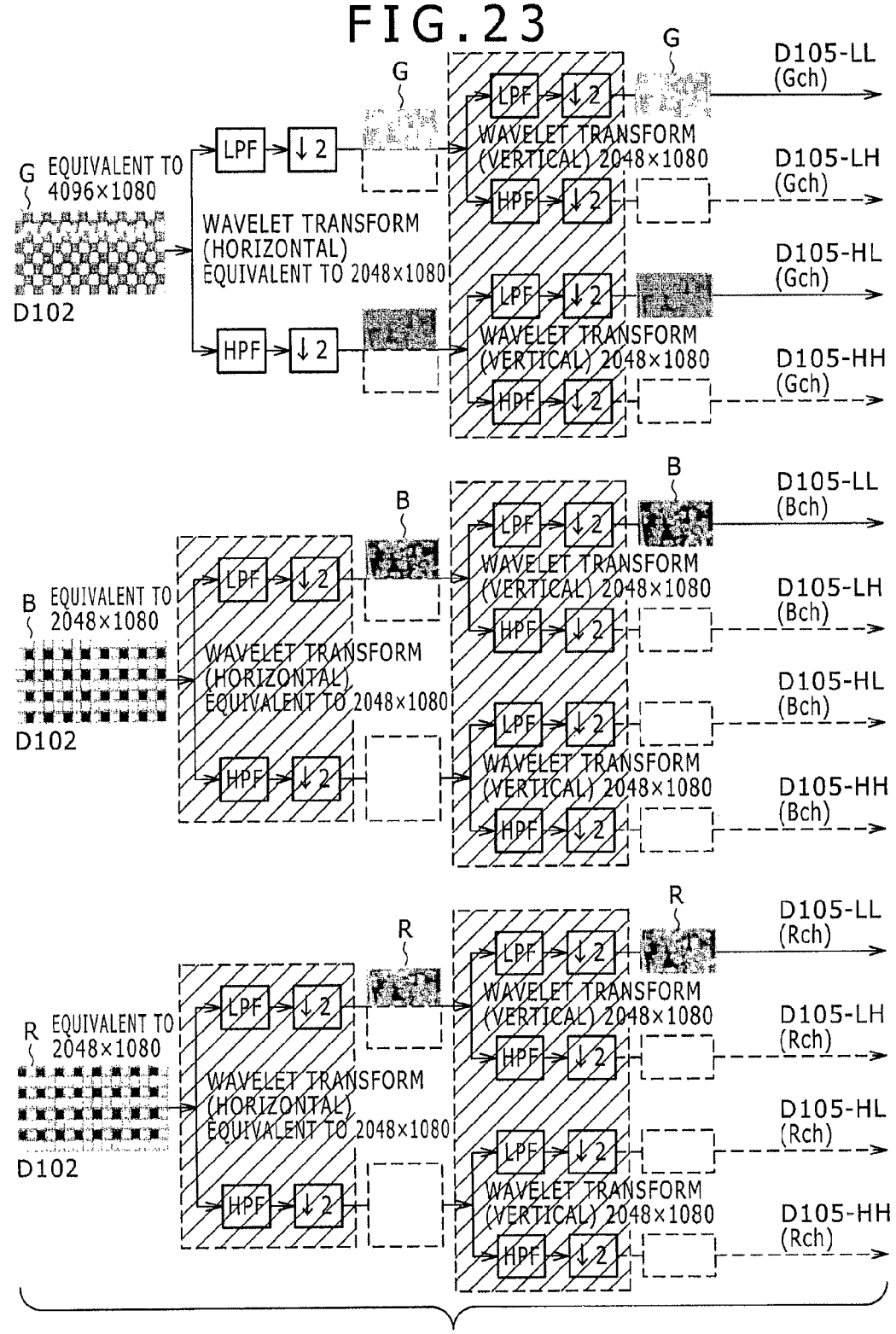
FIG. 23 is a diagram of concrete processing at a time of a wavelet transform of the compression and decompression I/F section for the Bayer arrangement.
Figure 24:
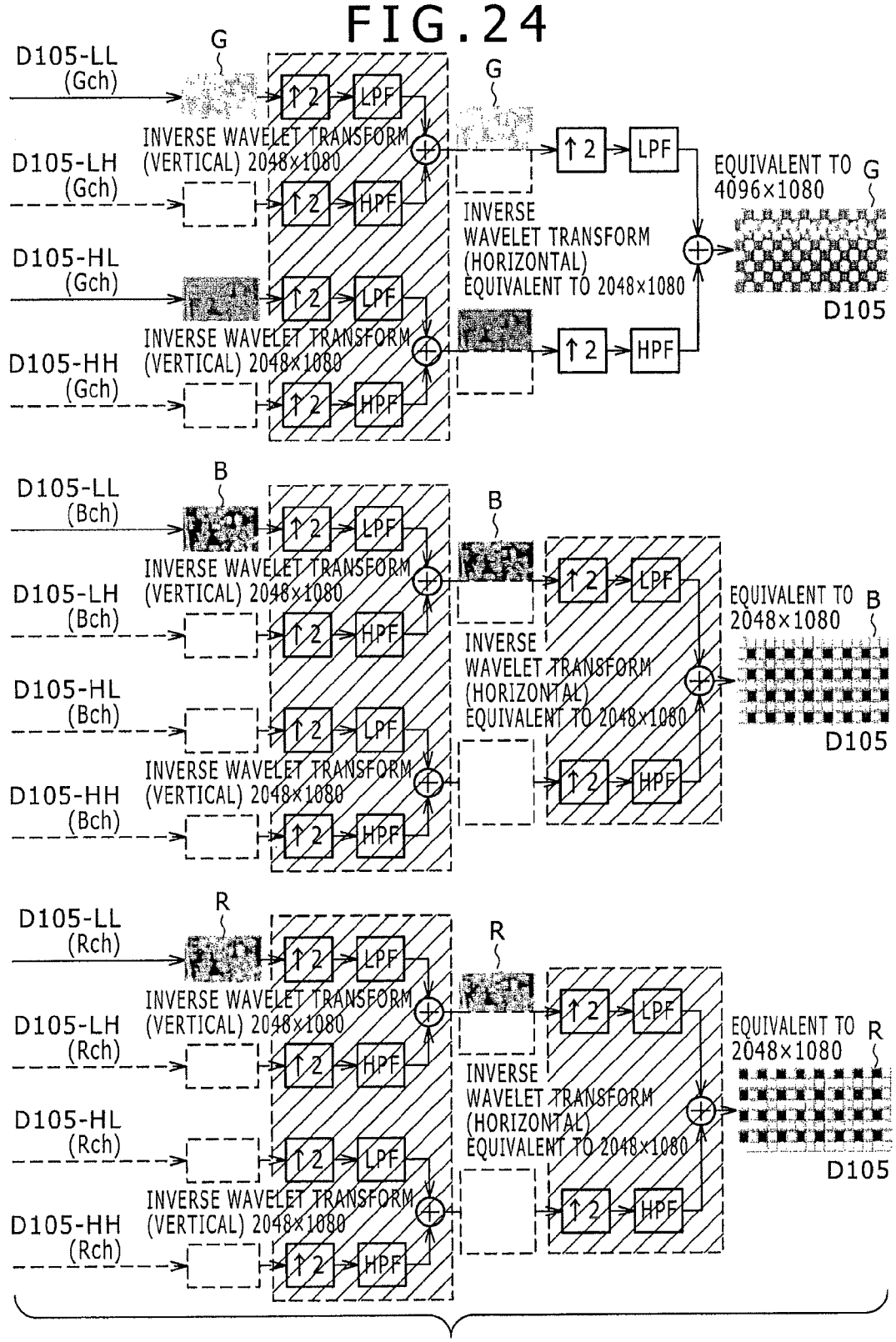
FIG. 24 is a diagram of concrete processing at a time of an inverse transform of the compression and decompression I/F section for the Bayer arrangement.

FIG. 23 and FIG. 24 are diagrams of assistance in explaining a processing method corresponding to an image pickup element of the normal Bayer arrangement (FIG. 23 corresponds to processing at a time of a wavelet transform, and FIG. 24 corresponds to processing at a time of an inverse transform).

As shown in FIG. 23, for a G image in recording RAW data of the normal Bayer arrangement, the compression and decompression I/F section 105 performs scanning as shown in FIG. 15B, and performs a wavelet transform only in the horizontal direction. However, as for an R image and a B image, the compression and decompression I/F section 105 does not perform a wavelet transform in the horizontal direction either, but performs bypass processing. The compression and decompression I/F section 105 bypasses the vertical direction wavelet transform circuits for each of the R image, the G image, and the B image, and outputs the results as they are. Thus, the compression and decompression I/F section 105 outputs four components of subbands of 2048×1080 size.

In addition, as shown in FIG. 24, also in the inverse transform, the compression and decompression I/F section 105 bypasses the vertical direction wavelet synthesis circuits for each of the R image, the G image, and the B image, and performs a wavelet synthesis in the horizontal direction only for the G image. As for the R image and the B image, the compression and decompression I/F section 105 does not perform a wavelet synthesis in the horizontal direction either, but performs bypass processing. Thus, the images can be restored to reproduced RAW data of the normal Bayer arrangement.

When the compression and decompression I/F section 105 thus bypasses wavelet circuits according to a kind of input recording RAW data, provision can be made for the image pickup elements of the various pixel arrangements. Thus, by only controlling the processing of the compression and decompression I/F section 105, processing from the compression and decompression processing section 106 on down can be made to be common processing only with differences in the number of components of input subband images.

In addition, processing from the compression and decompression processing section 106 on down can be performed as parallel processing. Specifically, in the compression and decompression processing section 106, the circuits for the subband image D105-LL in FIG. 3, the circuits for the subband image D105-HL in FIG. 3, the circuits for the subband image D105-LH in FIG. 3, and the circuits for the subband image D105-HH in FIG. 3 are each provided to three parallel systems for RGB, respectively (twelve systems in total). It is thus possible to use all of the systems in the case of a 4K RGB full image, and use only a part of the systems in other cases. Thus, operating speed can be reduced by an amount corresponding to a degree of parallelism. That is, a configuration suitable for real-time processing can be adopted.

In the past, a system handling high-resolution images such as 4K images and the like inevitably handles a large amount of signal processing. In addition, from a viewpoint of characteristics such as S/N, sensitivity and the like of the image pickup element, it is difficult to realize the system unless the number of pixels is reduced in advance by using the so-called Bayer arrangement or the like and then RAW data is recorded. However, because not all pixels of RGB are present, compression efficiency is not increased when compression recording is performed using the RAW data as it is, as described in the section of the background art.

On the other hand, by using the compression and decompression I/F section 105 and the compression and decompression processing section 106 according to the first embodiment described above, it is possible to convert an entire screen, which is a feature of the wavelet transform, and utilize high compression efficiency inherent in the wavelet transform. A great improvement in compression efficiency utilizing the inherent features of the wavelet transform can be expected with respect to compression of RAW data of an R image and a B image in the double density Bayer arrangement in particular.

In addition, pictures of different resolutions as a result of subband division can be obtained from one compression code, and the pictures can be used. This is because even simple color separation processing is performed by a wavelet transform.

Thus, it is possible to construct a system with a very high degree of hardware efficiency, which system is a low-resolution simple display system but does not require a special color separation circuit or a down-converting circuit.

Further, the processing of the compression and decompression I/F section 105 and the compression and decompression processing section 106 can be adapted to any pattern of the existing RGB full pixel system, the double density Bayer arrangement, the oblique arrangement three-panel system, and the normal Bayer arrangement. Thus, an effect of being able to perform common hardware processing with "differences in the number of subband image components" is produced. This indicates that an advantage of being able to perform parallel hardware processing and realize real-time processing in a system handling high-resolution images is also provided.

<2. Second Embodiment>
[Example of Compression-Coding or Decoding Image Using Haar Transform]

An example applied to an image pickup device 10 according to a second embodiment of the present invention will next be described with reference to FIGS. 25A to 27D.

As described above, the compression and decompression I/F section 105 in combination with a wavelet transform provides a method of most effective compression. However, not only the wavelet transform but also a Haar transform that reduces a hardware load can realize the method. At this time, the compression and decompression I/F section 105 subjects every two pixels adjacent to each other in an oblique direction in image data of a color in which pixel positions are alternately shifted from each other to a Haar transform with two upper and lower lines adjacent to each other as a unit.

FIGS. 25A to 25D show an example in which the compression and decompression I/F section 105 performs a Haar transform for the double density Bayer arrangement.

FIG. 25A shows the double density Bayer arrangement.

First making description for a G image, the G image has 4 k full pixels, and it therefore suffices to perform a Haar transform in place of a wavelet transform in a horizontal direction and a vertical direction as in the processing described with reference to FIGS. 11A to 11D.

At this time, the compression and decompression I/F section 105 subjects every two pixels adjacent to each other in an oblique direction in R and B image data of RGB image data output from an image pickup element section 102 of the double density Bayer arrangement to a Haar transform with two upper and lower lines adjacent to each other as a unit, and subjects G image data to a Haar transform in the horizontal direction with pixels of one line as a unit and a Haar transform in the vertical direction with pixels of one column as a unit.

A Haar transform is considered to be a two-tap subband filter, and is equivalent to obtaining a sum and a difference between two pixels. The sum corresponds to an LPF, and the difference corresponds to an HPF.

Specifically, as shown in FIG. 25B, every two pixels of a G image of 4096×2160 size is subjected to a Haar transform in the horizontal direction. Thus, as shown in FIG. 25C, a low-frequency subband G image (L) (sum) and a high-frequency subband G image (H) (difference) of 2048×2160 size halved in the horizontal direction are obtained.

Next, the low-frequency subband G image (L) (sum) and the high-frequency subband G image (H) (difference) of 2048×2160 size halved in the horizontal direction are each subjected to a Haar transform in the vertical direction, as shown in FIG. 25C. As a result, as shown in FIG. 25D, the low-frequency subband G image (L) (sum) and the high-frequency subband G image (H) (difference) of 2048×2160 size are converted into four kinds of subband G images of 2048×1080 size.

A subband G image (LL) of 2048×1080 size passed through a low-pass filter (sum) in both the horizontal direction and the vertical direction A subband G image (LH) of 2048×1080 size passed through a low-pass filter (sum) in the horizontal direction and a high-pass filter (difference) in the vertical direction A subband G image (HL) of 2048×1080 size passed through a high-pass filter (difference) in the horizontal direction and a low-pass filter (sum) in the vertical direction A subband G image (HH) of 2048×1080 size passed through a high-pass filter (difference) in both the horizontal direction and the vertical direction The low-frequency subband G image (L) (sum) and the high-frequency subband G image (H) (difference) of 2048×2160 size are converted into the above four kinds of subband G images of 2048×1080 size.

An R image and a B image have a checkered pattern. Thus, the R image and the B image are subjected to a Haar transform in place of a wavelet transform with two upper and lower lines adjacent to each other as a unit.

Specifically, as shown in FIG. 25B, every two oblique pixels in a unit of two upper and lower lines adjacent to each other of R pixels is subjected to a Haar transform.

As a result of the above, the R image is converted into:
a subband R image of 2048×1080 size passed through a low-pass filter (sum); and
a subband R image of 2048×1080 size passed through a high-pass filter (difference).

Every two oblique pixels (in an oppositely oblique direction from R) in a unit of two upper and lower lines adjacent to each other of B pixels is similarly subjected to a Haar transform to be converted into:
a subband B image of 2048×1080 size passed through a low-pass filter (sum); and
a subband B image of 2048×1080 size passed through a high-pass filter (difference).

As a result of the above, subband images of 2048×1080 size are already obtained, and the size coincides with the size of the subband images of G.

This means that subband images of uniform 2048×1080 size are obtained for all of RGB, that RGB full images of 2048×1080 size are obtained, and that simple so-called color separation has been performed.

Thus, the subband images as output from the compression and decompression I/F section 105 have the same size in the 4K full pixel system and the 4K double density Bayer arrangement, so that processing from the compression and decompression processing section 106 on down can be made to be common processing. This is the same as in the case of the wavelet transform.

In FIG. 25C and FIG. 25D, the subband images are described as follows for description of the R image and the B image having been subjected to the Haar transforms in the oblique directions.

The subband R image of 2048×1080 size passed through the low-pass filter (sum) is a subband R image (LL)

The subband R image of 2048×1080 size passed through the high-pass filter (difference) is a subband R image (HH)

The subband B image of 2048×1080 size passed through the low-pass filter (sum) is a subband B image (LL)

The subband B image of 2048×1080 size passed through the high-pass filter (difference) is a subband B image (HH)

The oblique directions of the R pixels and the B pixels shown in FIG. 25B are an example, and it is clear that the oblique directions are reversed when starting pixel positions of the R pixels and the B pixels become different.

A case of performing a Haar transform for the oblique arrangement three-panel system shown in FIG. 2 will next be described with reference to FIGS. 26A to 26D.

FIG. 26A shows the arrangement of the oblique arrangement three-panel system.

In FIG. 26B, as described with reference to FIGS. 14A to 14D, pixels indicated by hatching are considered to be nonexistent, and this pattern can therefore be considered to be the same as that of the R or B pixels in the double density Bayer arrangement described above with reference to FIGS. 25A to 25D.

A difference lies in that an R image, a B image, and a G image all have the same pattern.

It therefore suffices to subject the R image, the B image, and the G image to a Haar transform in place of a wavelet transform with two upper and lower lines adjacent to each other as a unit.

At this time, the compression and decompression I/F section 105 subjects every two pixels adjacent to each other in an oblique direction in all of RGB image data from the image pickup element section 102 of the oblique arrangement three-panel system to a Haar transform with two upper and lower lines adjacent to each other as a unit.

Specifically, as described with reference to FIG. 26B, every two oblique pixels in a unit of two upper and lower lines adjacent to each other is subjected to a Haar transform.

As a result of the above, the RGB images are each converted into:
a subband image of 2048×1080 size passed through a low-pass filter (sum); and
a subband image of 2048×1080 size passed through a high-pass filter (difference).

It is also shown from the above that subband images of 2048×1080 size are already obtained.

This means that subband images of uniform 2048×1080 size are obtained for all of RGB, that RGB full images of 2048×1080 size are obtained, and that simple so-called color separation has been performed.

Thus, the subband images as output from the compression and decompression I/F section 105 have the same size in the 4K full pixel system and the 4K oblique arrangement three-panel system, so that processing from the compression and decompression processing section 106 on down can be made to be common processing. This is the same as in the case of the wavelet transform.

In FIG. 26C and FIG. 26D, the subband images are described as follows for description of the Haar transforms in the oblique directions having been performed.

The subband R image of 2048×1080 size passed through the low-pass filter (sum) is a subband R image (LL)

The subband R image of 2048×1080 size passed through the high-pass filter (difference) is a subband R image (HH)

The subband G image of 2048×1080 size passed through the low-pass filter (sum) is a subband G image (LL)

The subband G image of 2048×1080 size passed through the high-pass filter (difference) is a subband G image (HH)

The subband B image of 2048×1080 size passed through the low-pass filter (sum) is a subband B image (LL)

The subband B image of 2048×1080 size passed through the high-pass filter (difference) is a subband B image (HH)

The oblique directions of the pixels shown in FIG. 26B are an example, and it is clear that the oblique directions are reversed when starting pixel positions of the R pixels and the B pixels become different.

A case of performing a Haar transform for the normal Bayer arrangement shown in FIG. 2 will next be described with reference to FIGS. 27A to 27D.

FIG. 27A shows the so-called normal Bayer arrangement.

In FIG. 27B, positions where real pixels are not present after separation into each of RGB are indicated by hatching. The R image and the B image are already discretely reduced images of 2048×1080 size in the separated state.

As is clear from FIG. 27B, the G image can be considered to be the same as the R pixels or the B pixels of the double density Bayer arrangement as described with reference to FIGS. 25A to 25D.

Therefore the G image is subjected to a Haar transform in place of a wavelet transform with two upper and lower lines adjacent to each other as a unit.

At this time, the compression and decompression I/F section 105 does not apply a Haar transform to R and B image data of RGB image data from the image pickup element section 102 of the Bayer arrangement, but subjects every two pixels adjacent to each other in an oblique direction in the image data of G to a Haar transform with two upper and lower lines adjacent to each other as a unit.

Specifically, as shown in FIG. 27B, every two oblique pixels in a unit of two upper and lower lines adjacent to each other is subjected to a Haar transform.

As a result of the above, the G image is converted into:
a subband G image of 2048×1080 size passed through a low-pass filter (sum); and
a subband G image of 2048×1080 size passed through a high-pass filter (difference).

It is also shown from the above that subband images of 2048×1080 size are already obtained.

This means that subband images of uniform 2048×1080 size are obtained for all of the RGB images though the R image and the B image are discretely reduced. Therefore, 2048×1080 RGB full images are obtained, and simple so-called color separation has been performed.

Thus, the subband images as output from the compression and decompression I/F section 105 have the same size in the 4K full pixel system and the 4K normal Bayer arrangement, so that processing from the compression and decompression processing section 106 on down can be made to be common processing. This is the same as in the case of the wavelet transform.

FIG. 27C and FIG. 27D, the subband images are described as follows for description of the G image having been subjected to the Haar transform in the oblique direction.

The R image of 2048×1080 size is a subband R image (LL)

The subband G image of 2048×1080 size passed through the low-pass filter (sum) is a subband G image (LL)

The subband G image of 2048×1080 size passed through the high-pass filter (difference) is a subband G image (HH)

The B image of 2048×1080 size is a subband B image (LL)

The oblique direction of the G pixels shown in FIG. 27B are an example, and it is clear that the oblique direction is reversed when a starting pixel position of G becomes different.

According to the second embodiment described above, the compression and decompression I/F section 105 can be realized by not only a wavelet transform but also a Haar transform for simpler hardware. Thus, as in the first embodiment, subsequent processing can be performed as parallel processing. In addition, because color separation can be made simply, the cost of manufacturing the device can be reduced.

It is to be noted that while wavelet transforms have been described with reference to the 5×3 reversible wavelet transform coefficients of JPEG2000, it is clear that wavelet transforms can also be realized with 9×7 irreversible transform coefficients and other transform coefficients, and are not limited to a 5×3 reversible wavelet transform or a Haar transform.

<3. Examples of Modification>

It is to be noted that the processing of the compression and decompression I/F section 105 and the processing of the compression and decompression processing section 106 described above can be carried out not only by hardware but also by software. When the series of processes is to be carried out by software, a program constituting the software can be executed by a computer incorporated in dedicated hardware or a computer on which programs for performing various functions are installed. For example, it suffices to install and execute a program constituting desired software on a general-purpose personal computer or the like.

In addition, a recording medium on which the program code of software for realizing the functions of the above-described embodiments is recorded may be supplied to a system or a device. In addition, it is needless to say that the functions are realized when a computer (or a controlling device such as a CPU or the like) of the system or the device reads and executes the program code stored on the recording medium.

Usable as the recording medium for supplying the program code in this case is for example a flexible disk, a hard disk, an optical disk, a magneto-optical disk, a CD-ROM, a CD-R, a magnetic tape, a nonvolatile memory card, a ROM or the like.

The functions of the above-described embodiments are realized by executing the program code read by the computer. In addition, an OS operating on the computer or the like performs a part or all of actual processing on the basis of directions of the program code. A case where the functions of the above-described embodiments are realized by the processing is also included.

In addition, while the present invention is applied to an image pickup device in the above embodiments, the present invention is also applicable for compression coding of RAW data obtained from image pickup elements of the double density Bayer arrangement, the oblique arrangement three-panel system, and the Bayer arrangement in devices other than image pickup devices.

In addition, the present invention is similarly applicable for compression coding of RAW data obtained from an image pickup element of a pixel arrangement that is other than the double density Bayer arrangement, the oblique arrangement three-panel system, or the Bayer arrangement and in which pixel arrangement pixel positions of at least one of three primary colors are alternately shifted from each other in a horizontal direction or a vertical direction.

In addition, the present invention is not limited to the above-described embodiments, and various other examples of application and various other examples of modification can of course be adopted without departing from the spirit of the present invention described in claims.

The present application contains subject matter related to that disclosed in Japanese Priority Patent Application JP 2009-288074 filed in the Japan Patent Office on Dec. 18, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing device comprising:
a subband dividing section configured to perform subband division of color image data included in pickup image data output from an image pickup element, the pickup image data having pixel positions of respective primary color components that are alternately shifted from each other in a horizontal direction or a vertical direction, the subband division producing respective subband images of respective primary color components of the pickup image data, the primary color component images having combinations of low and high frequencies in horizontal and vertical directions of the image, the pixels of the respective primary color components that are disposed in two adjacent upper and lower horizontal lines or the pixels that are disposed in two adjacent left and right vertical columns comprising a unit, the subband division not being performed on color image data of a primary color component whose pixel positions are not alternately shifted from each other; and
a compression coding section configured to perform compression-coding of the color image data output from said subband dividing section in parallel for each of the subband images and for each of said three primary colors.

2. An image processing method comprising the steps of:
subband dividing color image data included in pickup image data output from an image pickup element, the pickup image data having pixel positions of respective primary color components that are alternately shifted from each other in a horizontal direction or a vertical direction, the subband division producing respective subband images of respective primary color components of the pickup image data, the primary color component images having combinations of low and high frequencies in horizontal and vertical directions of the image, with the pixels of the respective primary color components that are disposed in two adjacent upper and lower horizontal lines adjacent or the pixels that are disposed in two adjacent left and right vertical columns comprising a unit, the subband division not being performed on color image data of a primary color component whose pixel positions are not alternately shifted from each other; and
compression-coding the color image data resulting from the subband division in parallel for each of the subband images and for each of said three primary colors.

3. An image processing device comprising:
subband dividing means for performing subband division of color image data included in pickup image data output from an image pickup element, the pickup image data having pixel positions of respective primary color components that are alternately shifted from each other in a horizontal direction or a vertical direction, the subband division producing respective subband images of respective primary color components of the pickup image data, the primary color component images having combinations of low and high frequencies in horizontal and vertical directions of the image, the pixels of the respective primary color components that are disposed in two adjacent upper and lower horizontal lines or the pixels that are disposed in two adjacent left and right vertical columns comprising a unit, the subband division not being performed on color image data of a primary color component whose pixel positions are not alternately shifted from each other; and
compression coding means for performing compression-coding of the color image data output from said subband dividing means in parallel for each of the subband images and for each of said three primary colors.

* * * * *